(12) United States Patent
Sangu

(10) Patent No.: US 9,081,186 B2
(45) Date of Patent: Jul. 14, 2015

(54) MICROSCOPE DEVICE FOR GENERATING IMAGES OF A SPECIMEN USING PHASE DISTRIBUTION OF LIGHT

(71) Applicant: YOKOGAWA ELECTRIC CORPORATION, Tokyo (JP)

(72) Inventor: Hiroyuki Sangu, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 174 days.

(21) Appl. No.: 13/678,694

(22) Filed: Nov. 16, 2012

(65) Prior Publication Data

US 2013/0128346 A1 May 23, 2013

(30) Foreign Application Priority Data

Nov. 22, 2011 (JP) .................................. 2011-255192
Mar. 22, 2012 (JP) .................................. 2012-065670

(51) Int. Cl.
*G02B 21/06* (2006.01)
*G02B 21/00* (2006.01)

(52) U.S. Cl.
CPC ............ *G02B 21/06* (2013.01); *G02B 21/0032* (2013.01); *G02B 21/0044* (2013.01); *G02B 21/0056* (2013.01); *G02B 21/0076* (2013.01)

(58) Field of Classification Search
CPC ............... G02B 21/06; G02B 21/0032; G02B 21/0044; G02B 21/0056; G02B 21/0076
USPC .................................................. 359/385, 388
See application file for complete search history.

(56) References Cited

U.S. PATENT DOCUMENTS

| | | | |
|---|---|---|---|
| 4,561,731 A * | 12/1985 | Kley | 349/1 |
| 5,625,613 A | 4/1997 | Kato et al. | |
| 6,480,285 B1 * | 11/2002 | Hill | 356/492 |
| 7,880,820 B2 * | 2/2011 | Yelleswarapu et al. | 349/18 |
| 7,990,611 B2 * | 8/2011 | Betzig | 359/385 |
| 8,487,271 B2 * | 7/2013 | Yokoi et al. | 250/458.1 |
| 2002/0089741 A1 * | 7/2002 | Kuhn | 359/387 |
| 2007/0014001 A1 | 1/2007 | Ujike et al. | |
| 2009/0009859 A1 | 1/2009 | Kawai et al. | |
| 2009/0046298 A1 * | 2/2009 | Betzig | 356/521 |
| 2010/0067103 A1 | 3/2010 | Sangu | |

(Continued)

FOREIGN PATENT DOCUMENTS

| | | | |
|---|---|---|---|
| JP | 7234382 A | 9/1995 | |
| JP | 2006317544 A | 11/2006 | |

(Continued)

*Primary Examiner* — Frank Font
(74) *Attorney, Agent, or Firm* — Lowe Hauptman & Ham, LLP

(57) ABSTRACT

A microscope device according to the present disclosure (the present microscope device) includes: a light source configured to oscillate coherent illuminating light, the illuminating light being applied on a specimen; a detecting unit configured to detect fluorescent light from the specimen as feedback light, the specimen being irradiated with the illuminating light; a phase distribution control unit disposed in an optical path of the illuminating light, the phase distribution control unit being configured to control phase distribution of the illuminating light; a controller configured to control the phase distribution control unit to vary the phase distribution; and an image generating unit configured to operate a difference of the feedback light between before and after the phase distribution varies, to generate an image of the specimen.

10 Claims, 17 Drawing Sheets

(56) References Cited

U.S. PATENT DOCUMENTS

2010/0128283 A1* 5/2010 Liesener et al. ............. 356/511
2013/0286181 A1* 10/2013 Betzig et al. ................. 348/79

FOREIGN PATENT DOCUMENTS

| JP | 2010197986 A | 9/2010 |
| WO | 2007088947 A1 | 8/2007 |

* cited by examiner

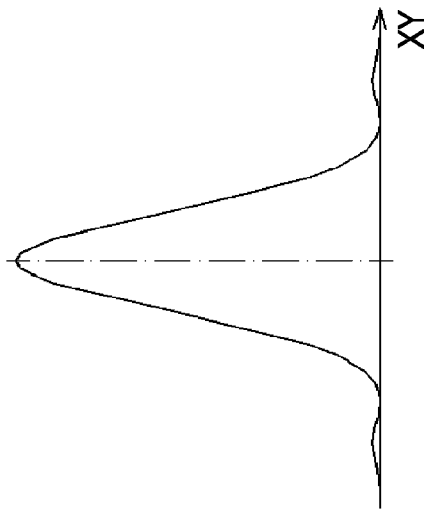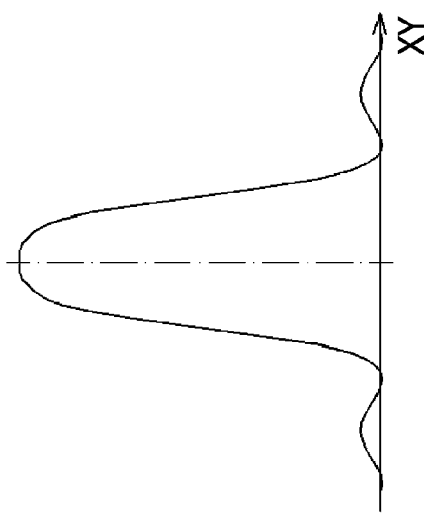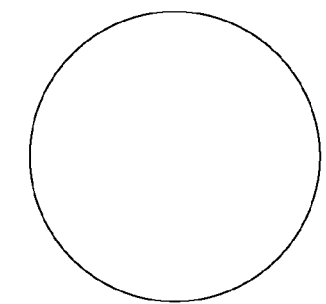

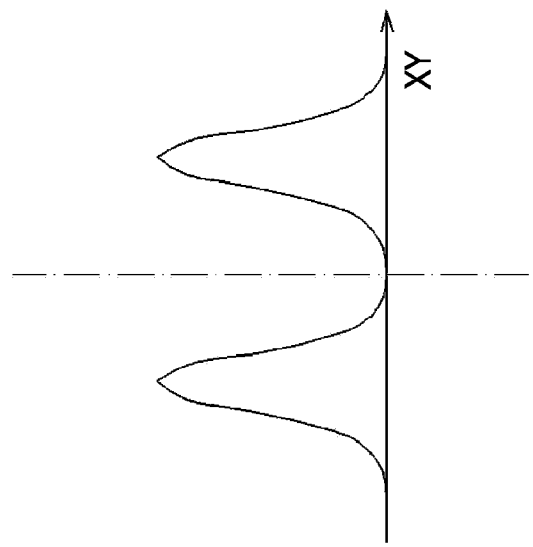
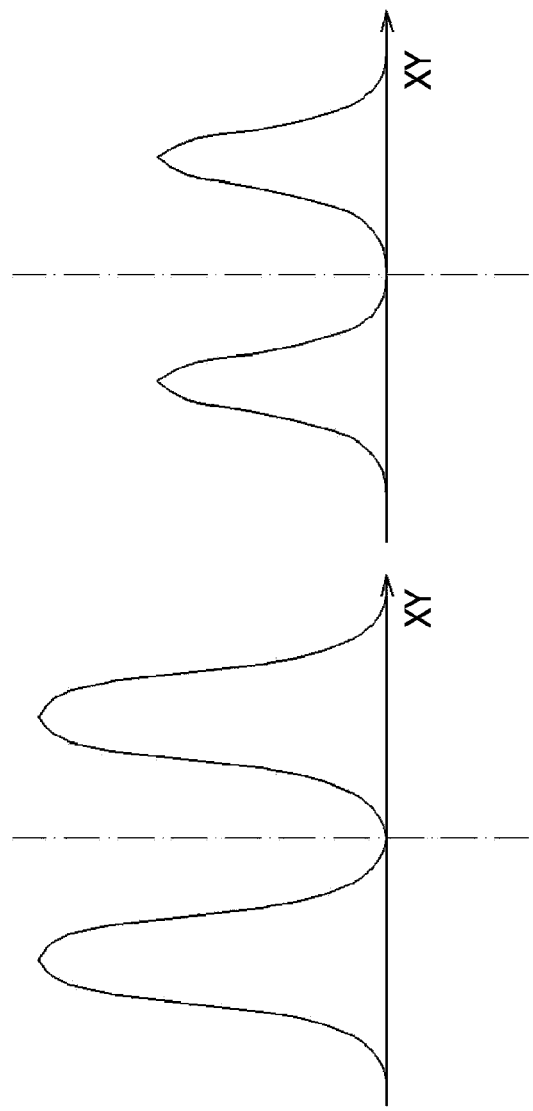
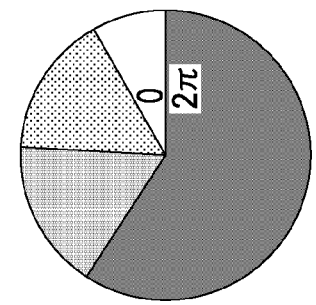

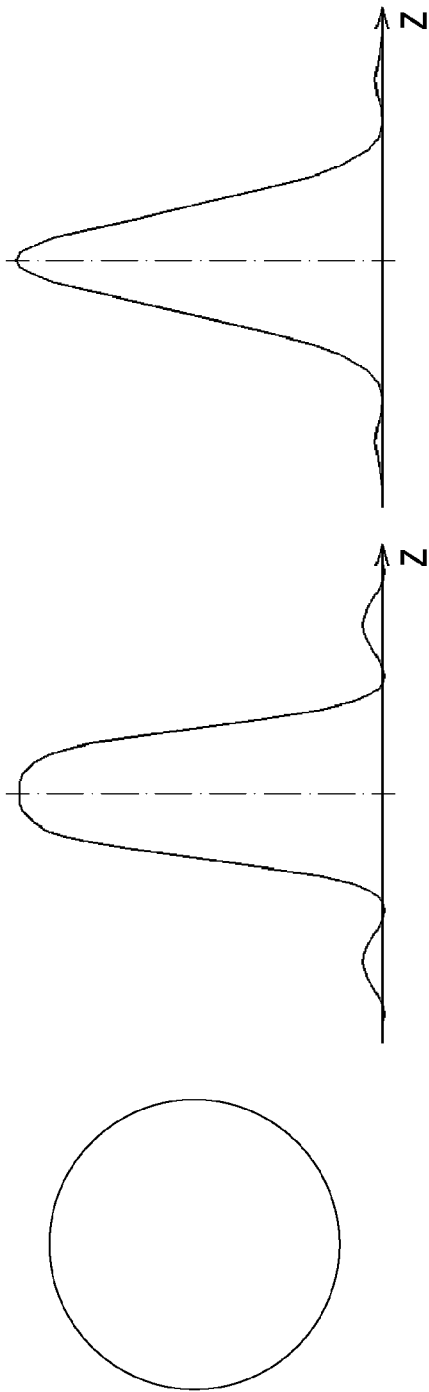

MICROSCOPE DEVICE FOR GENERATING IMAGES OF A SPECIMEN USING PHASE DISTRIBUTION OF LIGHT

CROSS-REFERENCE TO RELATED APPLICATION

This application is based on Japanese Patent Application Nos. 2011-255192 filed on Nov. 22, 2011 and 2012-065670 filed on Mar. 22, 2012 with the Japan Patent Office, the entire contents of which are hereby incorporated by reference.

BACKGROUND

1. Technical Field

The present disclosure relates to a microscope device.

2. Related Art

A microscope device irradiates, for example, a specimen with illuminating light. Thus, the specimen emits fluorescent light. The microscope device detects this fluorescent light to generate an image. The microscope device can observe, for example, a deep portion of the specimen.

A known microscope device introduces, for example, fluorescent pigment and/or fluorescent protein into the specimen. Irradiating such a specimen with laser light allows the specimen to be excited. This makes the specimen to emit the fluorescent light. An image of the specimen is obtained based on this fluorescent light. Especially, when the deep portion of the specimen is observed, influence of feedback light from other portions than a focal surface of the illuminating light degrades S/N ratio of the image to be generated. This degradation phenomenon is not sufficiently removed even if a confocal microscope is used.

A related technique is disclosed in JP-A-2010-197986. The technique in this publication separates coherent illuminating light into two rays of light. At least one of the two rays illuminating light, which are obtained by this separation, is modulated. Then, interference light, which is obtained by overlapping of the two rays of illuminating light, is detected. This detection increases the S/N ratio in the observation of the deep portion.

SUMMARY

A microscope device according to the present disclosure (the present microscope device) includes: a light source configured to oscillate coherent illuminating light, the illuminating light being applied on a specimen; a detecting unit configured to detect fluorescent light from the specimen as feedback light, the specimen being irradiated with the illuminating light; a phase distribution control unit disposed in an optical path of the illuminating light, the phase distribution control unit being configured to control phase distribution of the illuminating light; a controller configured to control the phase distribution control unit to vary the phase distribution; and an image generating unit configured to operate a difference of the feedback light between before and after the phase distribution varies, to generate an image of the specimen.

BRIEF DESCRIPTION OF DRAWINGS

FIG. 4A is a diagram illustrating phase distribution in first control;

FIG. 4B is a diagram illustrating intensity distribution in the first control;

FIG. 4C is a diagram illustrating intensity distribution in the first control;

FIG. 5A is a diagram illustrating phase distribution in second control;

FIG. 5B is a diagram illustrating intensity distribution in the second control;

FIG. 5C is a diagram illustrating intensity distribution in the second control;

FIG. 9A is a diagram illustrating phase distribution in first control according to Modification 2;

FIG. 9B is a diagram illustrating intensity distribution in the first control according to Modification 2;

FIG. 9C is a diagram illustrating intensity distribution in the first control according to Modification 2;

DETAILED DESCRIPTION

Figure 1:
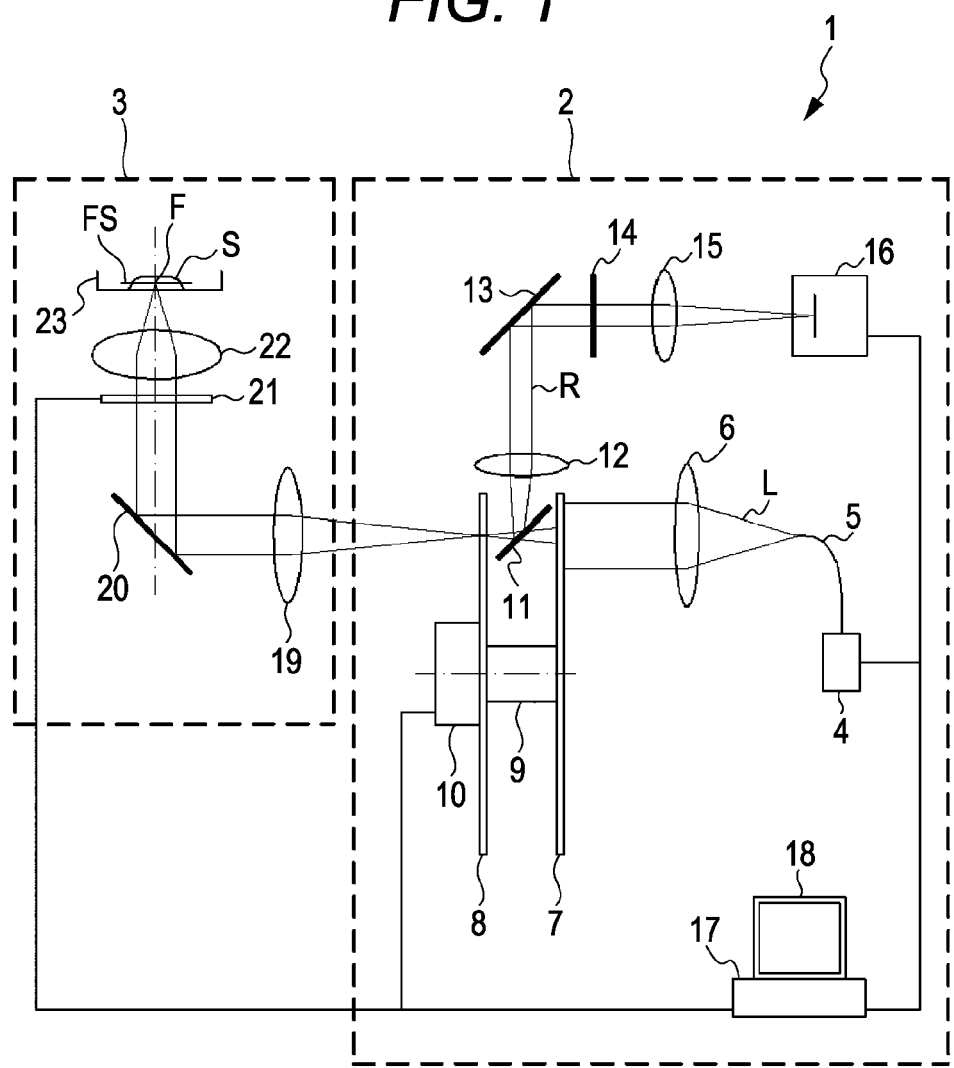
FIG. 1 is a schematic configuration diagram of a microscope device according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As described above, the technique in JP-A-2010-197986 increases the S/N ratio in the observation of the deep portion. However, this technique employs detecting means that detects the feedback light. The detecting means includes a bandpass filter that extracts a specific frequency component. The deep portion of the specimen is observed using the specific frequency component extracted by this bandpass filter. In view of this, the bandpass filter is disposed inside of the microscope device. This results in a complicated circuit structure.

When the specimen is irradiated with the illuminating light, fluorescent light is emitted from portions other than the focal surface. For example, scattering of this fluorescent light emits a stray light component. This stray light component causes deterioration of image contrast when the deep portion of the specimen is observed. This consequently degrades accuracy of the image of the specimen.

Additionally, the technique in JP-A-2010-197986 modulates interference light using a specific frequency for each focal point. In view of this, each focal point is irradiated with the illuminating light for a certain period of time. That is, in this technique, two rays of light that are modulated using respective different frequencies interfere with each other in an intersection region. Interference light is intensity-modulated with a frequency that is a difference between frequencies of the two rays of light. Accordingly, scanning with the illuminating light is stopped for a certain period of time at every focal point. This consequently slows speed of image generation.

An object of the present disclosure is to provide a microscope device with a simple circuit configuration to observe a deep portion of a specimen at high speed and accurately.

To solve the problem described above, a microscope device of the present disclosure (the present microscope device) includes a light source, a detecting unit, a phase distribution control unit, a controller, and an image generating unit. The light source is configured to oscillate coherent illuminating light. A specimen is irradiated with the illuminating light. The detecting unit is configured to detect fluorescent light from the specimen irradiated with the illuminating light as feedback light. The phase distribution control unit is disposed in an optical path of the illuminating light. The phase distribution control unit is configured to control phase distribution of the illuminating light. The controller is configured to control the phase distribution control unit such that the phase distribution varies. The image generating unit is configured to operate a difference of the feedback light between before and after the phase distribution varies to generate an image of the specimen.

The present microscope device allows the phase distribution control unit to vary phase distribution of the illuminating light. Varying the phase distribution makes the illuminating light to interfere adjacent to the focal point. Additionally, the difference of the image obtained before and after the phase distribution varies is operated. This allows for generation of an image of a deep portion (a portion in the predetermined depth) of the specimen without any circuit such as a bandpass filter. Operating the difference between the images allows for removal of a stray light component. Additionally, this reduces stopping of scanning with the illuminating light. This consequently allows for generation of the image in the deep portion of the specimen at high speed and accurately.

The controller may perform first control that controls the phase distribution control unit such that almost the whole illuminating light has a uniform phase, and second control that controls the phase distribution control unit such that the illuminating light has phase distribution where the rays of illuminating light mutually interfere on the focal point. The image generating unit may operate a difference between the feedback light in the first control and the feedback light in the second control to generate an image of the specimen.

In the first control, almost the whole illuminating light has a uniform phase. In view of this, the illuminating light does not easily interfere. On the other hand, in the second control, the phase distribution of the illuminating light varies. Accordingly, the illuminating light interferes on the focal point. Operating the difference between the image obtained in the first control and the image obtained in the second control allows for generation of the image in the predetermined deep portion corresponding to the focal point.

The present microscope device may further include an objective lens that focuses the illuminating light on the specimen. Additionally, the phase distribution control unit may be disposed in a position equivalent to a pupil including a pupil position of the objective lens.

The phase distribution control unit is disposed in a position equivalent to a pupil including a pupil position of the objective lens. This allows for acquisition of a clear image of the predetermined deep portion of the specimen.

The controller may control the phase distribution control unit such that the phase distribution control unit provides the illuminating light with a phase that continuously varies from zero to $2\pi$ along the circumferential direction.

In this case, in the second control, the phase distribution control unit controls the phase of the illuminating light to continuously vary as described above. This allows the illuminating light to interfere on the focal point of the specimen. This consequently allows for acquisition of the image in the predetermined deep portion of the specimen in the XY direction at high speed and accurately.

The controller may control the phase distribution control unit such that phase distribution of the illuminating light becomes distribution where a region with a phase of zero and a region with a phase of $2\pi$ are alternately arranged along the circumferential direction.

In this case, in the second control, the phase distribution control unit forms the phase of the illuminating light as described above. This allows the illuminating light to interfere on the focal point of the specimen. This consequently allows for acquisition of the image in the predetermined deep portion of the specimen in the XY direction at high speed and accurately.

The controller may control the phase distribution control unit such that the illuminating light has a center circular region with a phase of $\pi$ and a ring region with a phase of zero in a peripheral region of the center circular region.

In this case, in the second control, the phase distribution control unit forms the phase of the illuminating light as described above. This allows the illuminating light to interfere on the focal point of the specimen. This consequently allows for acquisition of the image in the predetermined deep portion of the specimen in the Z direction at high speed and accurately.

The phase distribution control unit may be a spatial light modulator. The spatial light modulator may be a reflective spatial light modulator that reflects the illuminating light in the optical path at a reflection angle of approximately 90 degrees in order to lead the illuminating light oscillated from the light source to the specimen.

Accordingly, the phase distribution control unit may be a reflective spatial light modulator. In view of this, the phase distribution control unit can have a function that controls the phase distribution of the illuminating light and a function that reflects the light. This consequently allows for reduction of the optical component used in the present microscope device.

The phase distribution control unit may provide phase distribution to correct spherical aberration to the illuminating light. The spherical aberration is generated by a refractive index difference between a refractive index of a medium of an optical path to the specimen and a refractive index of a medium of the specimen.

A plurality of mediums with different refractive indexes exists between the optical path to the specimen and the specimen. In view of this, spherical aberration is caused by the difference between the refractive indexes. This spherical aberration deteriorates accuracy of the image. Accordingly, the phase distribution control unit provides the illuminating light with phase distribution to correct the refractive index difference. This consequently allows for acquisition of an image with corrected spherical aberration The present microscope device may include a microlens disk, a pinhole disk, and a rotating unit. The microlens disk includes plural microlenses that are arranged in a spiral pattern. The pinhole disk includes plural pinholes that are arranged in the similar pattern to that of the microlenses, in a position separated from this microlens disk. The rotating unit integrally rotates the microlens disk and the pinhole disk.

With this configuration, the present microscope device makes a Nipkow disk confocal microscope. This allows for generation of the image to observe the deep portion of the specimen at high speed.

In the present microscope device, the phase distribution control unit varies the phase distribution of the illuminating light while operating the difference between the rays of feedback light. This allows for observation of the deep portion of the specimen without any circuit such as a bandpass filter. Because the difference between the rays of feedback light is operated, a stray light component can be removed. Additionally, this reduces stopping of scanning with the illuminating light. This consequently allows for observation of the deep portion of the specimen at high speed and accurately.

Embodiments of the present disclosure will be described below with reference to the accompanying drawings. FIG. 1 illustrates a microscope device 1 according to this embodiment. The microscope device 1 includes a scanning optical system 2 and a microscope optical system 3. The microscope device 1 in FIG. 1 can observe a deep portion of a specimen S such as a living body. The microscope device 1 is a Nipkow disk confocal microscope. This, however, should not be construed in a limiting sense. The microscope device 1 may be a mirror scanning microscope describe later.

As illustrated in FIG. 1, the scanning optical system 2 includes a laser light source 4, an optical fiber 5, a collimator lens 6, a microlens disk 7, a pinhole disk 8, a coupling drum 9, a motor 10, a dichroic mirror 11, a first relay lens 12, a reflective mirror 13, a fluorescent filter 14, a second relay lens 15, a camera 16, a controller 17, and a display 18.

The laser light source 4 oscillates coherent laser light L (illuminating light). This laser light L has a wavelength that makes the specimen (such as a living body) S irradiated with the laser light L to emit fluorescent light. The laser light source 4 and the optical fiber 5 are coupled together. The laser light L enters the optical fiber 5. Subsequently, the laser light L emitted from an emitting end of the optical fiber 5 turns into diffusion light. The collimator lens 6 is disposed on an optical path of the laser light L. The collimator lens 6 converts the laser light L into collimated light.

Figure 2:
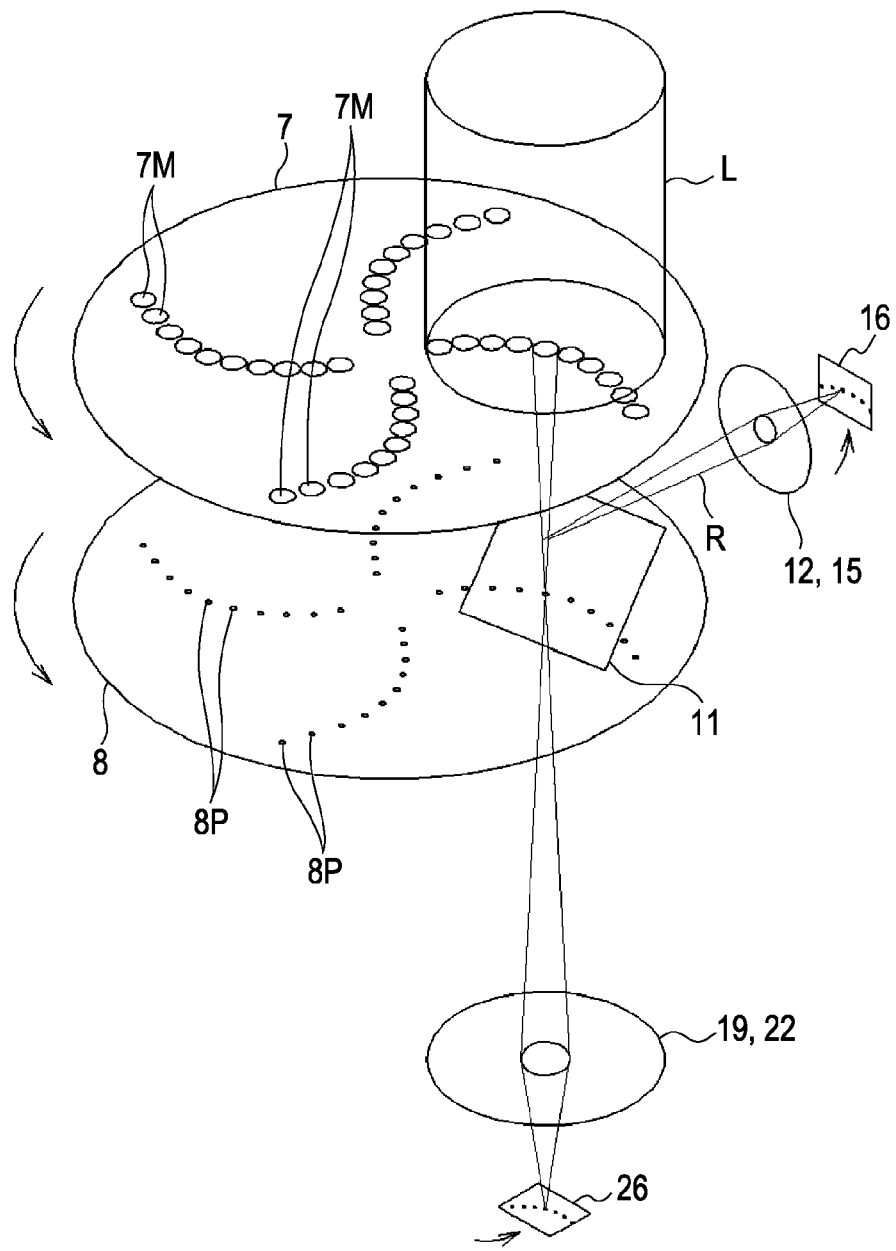
FIG. 2 is a diagram illustrating a microlens disk and a pinhole disk.

The laser light L emitted from the collimator lens 6 enters the microlens disk 7. As illustrated in FIG. 2, the microlens disk 7 is a disk-shaped rotating disk. Plural (four in the drawing) microlenses 7M are arranged in a spiral pattern on the microlens disk 7.

As illustrated in FIG. 2, the pinhole disk 8 is a disk-shaped rotating disk. Plural (four in the drawing) pinholes 8P are arranged in a spiral pattern on the pinhole disk 8. The pinholes 8P are arranged in a pattern similar to that of the microlenses 7M. The pinholes 8P allow light only from a focal surface FS of the specimen S, which is described later, to pass through. Thus, the microscope device 1 functions as a confocal microscope.

In FIG. 2, an imaging lens 19 and an objective lens 22 are schematically illustrated as one lens. Similarly, the first relay lens 12 and the second relay lens 15 are schematically illustrated as one lens. The coupling drum 9 and the motor 10 constitute a rotating unit.

There is predetermined distance between the microlens disk 7 and the pinhole disk 8. When the motor 10 provides rotation force to the coupling drum 9, the microlens disk 7 and the pinhole disk 8 integrally rotate. The laser light L, which is converted into collimated light by the collimator lens 6, enters the microlens 7M. This microlens 7M makes the laser light L focused on a focal point in the corresponding pinhole 8P.

The dichroic mirror 11 is disposed between the microlens disk 7 and the pinhole disk 8. The dichroic mirror 11 transmits light in a wavelength range of the laser light L while the dichroic mirror 11 reflects light in a wavelength range of feedback light R. The feedback light R includes fluorescent light from the specimen S. Accordingly, as illustrated in FIG. 1, the feedback light R is converted into collimated light by the first relay lens 12. An optical path of the feedback light R is bent approximately at 90 degrees by the reflective mirror 13.

The fluorescent filter 14 is disposed in the downstream of the reflective mirror 13 in the optical path of the feedback light R. This fluorescent filter 14 allows light only in a wavelength range of the fluorescent light from the specimen S to pass through. The feedback light R after passing through the fluorescent filter 14 enters the second relay lens 15. Subsequently, the feedback light R converged by the second relay lens 15 is received by the camera 16. The camera 16 has a photo-receiving surface. The photo-receiving surface of the camera 16 is scanned with the feedback light R. This allows the camera 16 to detect a light amount of the feedback light R. Additionally, the camera 16 functions as a detecting unit. The detecting unit performs photoelectric conversion of the light amount of the feedback light R so as to generate an electrical signal (light amount data). This electrical signal is output to the controller 17.

The controller 17 generates image data of the deep portion of the specimen S based on the input electrical signal. The display 18 displays this image data. Displaying the image data of the deep portion of the specimen S on the display 18 allows for observation of the deep portion of the specimen S. The image data generated by the controller 17 may be stored in an internal memory (not shown).

Next, the microscope optical system 3 will be described. The microscope optical system 3 includes an imaging lens 19, a reflective mirror 20, a spatial light phase modulator 21, the objective lens 22, and a dish 23. The imaging lens 19 converts the laser light L focused on the focal point in the pinhole 8P into collimated light. The reflective mirror 20 reflects the laser light L, which has been converted into the collimated light. Therefore, an optical path of the laser light L is bent approximately at 90 degrees.

The spatial light phase modulator 21 is a phase distribution control unit that can vary phase distribution of the laser light L and the feedback light R. The spatial light phase modulator 21 is disposed on the optical paths of the laser light L and the feedback light R. The spatial light phase modulator 21 can control the phase distribution of the laser light L and the feedback light R. The objective lens 22 makes the laser light L operated upon by the spatial light phase modulator 21 be focused in the specimen S mounted on the dish 23. The drawing illustrates a focal surface FS.

Figure 3:
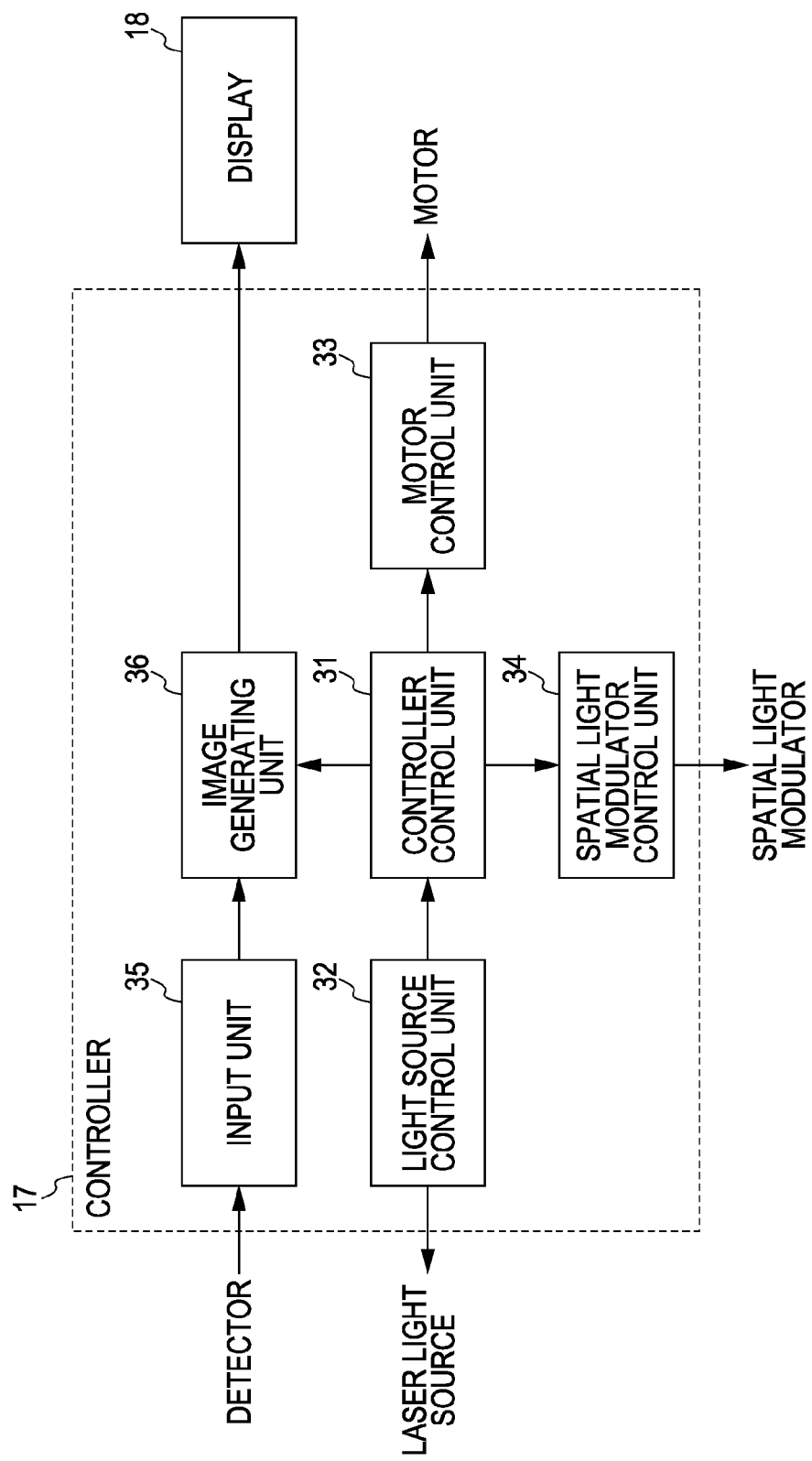
FIG. 3 is a block diagram illustrating a configuration of a controller.

Next, a configuration of the controller 17 will be described with reference to FIG. 3. The controller 17 includes a controller control unit 31, a light source control unit 32, a motor control unit 33, a spatial light modulator control unit 34, an input unit 35, and an image generating unit 36. The controller 17 is, for example, a computer. This computer functions as the respective elements 31 to 36 of the controller 17 using predetermined software.

The controller control unit 31 controls the whole controller 17. The light source control unit 32 controls the laser light source 4. The light source control unit 32 controls the laser light source 4 to oscillate the laser light L at least twice. This laser light L, which is oscillated by the laser light source 4, has a wavelength that makes the specimen S excited.

The motor control unit 33 controls the motor 10. The motor control unit 33 rotates the motor 10 to apply rotation force to the coupling drum 9. This integrally rotates the microlens disk 7 and the pinhole disk 8, which are integrally constituted via the coupling drum 9.

The input unit 35 receives a light amount of the feedback light R, which is detected by the camera 16, as light amount data from the camera 16. The input unit 35 outputs the light amount data obtained from the camera 16 to the image generating unit 36. The image generating unit 36 generates an image (image data) of a scanning area in the specimen S based on this light amount data.

As described above, the laser light source 4 oscillates the laser light L at least twice. The image generating unit 36 generates the image data that is obtained by scanning of the laser light L oscillated at the first time as first image data. The image generating unit 36 generates the image data that is obtained by scanning of the laser light L oscillated at the second time as second image data. Subsequently, the image generating unit 36 generates the image data by operating a difference between the first image data and the second image data. This image data indicates an image of a predetermined deep portion of the specimen S. This image data is displayed on the display 18.

Next, operation will be described. As described above, the laser light L is oscillated at least twice. Hereinafter, the light source control unit 32 is assumed to control the laser light source 4 to oscillate the laser light L twice. The control for obtaining the first image data using the laser light L oscillated at the first time is assumed to be first control. The control for obtaining the second image data using the laser light L oscillated at the second time is assumed to be second control.

At the first time (first control), the spatial light modulator control unit 34 controls the spatial light phase modulator 21 such that almost the whole light that has passed through the spatial light phase modulator 21 has a uniform phase. The spatial light phase modulator 21 controls the phase distribution of the laser light L and the feedback light R. This control of the phase distribution can vary phase distribution of the laser light L and the feedback light R in a cross section of the optical path. However, in the first control, the spatial light phase modulator 21 controls the phase distribution of the laser light L and the feedback light R to have distribution (uniform phase distribution) where the whole phases are almost uniform. FIG. 4A illustrates phase distribution of the laser light L and the feedback light R in the cross section of the optical path, which is obtained by uniform phase control by the spatial light phase modulator 21.

The laser light L is guided to the collimator lens 6 through the optical fiber 5, and converted into collimated light by the collimator lens 6. At this time, the motor control unit 33 of the controller 17 applies rotation force to the motor 10 and the coupling drum 9. Accordingly, the microlens disk 7 and the pinhole disk 8 integrally rotate. The laser light L, which is converted into the collimated light by the collimator lens 6, is focused on a focal point in the corresponding pinhole 8P by the microlens 7M of the microlens disk 7.

Subsequently, the laser light L, which is focused on the focal point in the pinhole 8P, is converted into collimated light by the imaging lens 19. Subsequently, the optical path of the laser light L is bent approximately at 90 degrees by the reflective mirror 20. This allows the laser light L to enter the spatial light phase modulator 21. As described above, the spatial light phase modulator 21 controls a phase of the laser light L such that all phases are uniform. Accordingly, the phase of the laser light L becomes uniform in all areas of the cross section of the optical path.

At this time, intensity distribution of the laser light L in the XY plane including a focal point F of the specimen S follows a point spread function (PSF) of the objective lens 22. This intensity distribution (light amount distribution) forms, as illustrated in FIG. 4B, Gaussian distribution where a light amount in the center of the optical axis is highest while a light amount in a peripheral region is low. A one dot chain line in the drawing illustrates the center of the optical axis.

This laser light L enters the objective lens 22. The laser light L is focused on the focal point F at the predetermined depth of the specimen S by operation of the objective lens 22. The laser light L is applied and focused on the focal point F, thus exciting the specimen S. As a result, fluorescent light is emitted. This fluorescent light turns into the feedback light R, and enters the objective lens 22 again. The feedback light R converted into collimated light by the objective lens 22 enters the spatial light phase modulator 21.

Focusing on the feedback light R, the feedback light R is operated upon by the spatial light phase modulator 21 to make all phases uniform. Therefore, the intensity distribution of the feedback light R after passing through the spatial light phase modulator 21 forms Gaussian distribution as illustrated in FIG. 4B.

In this embodiment, both the laser light L and the feedback light R are operated upon by the spatial light phase modulator 21. Accordingly, the intensity distribution of the feedback light R operated upon by the spatial light modulator 21 is the square of point spread function in FIG. 4B. This intensity distribution is illustrated in FIG. 4C. Therefore, this provides a high resolution in the XY direction of the feedback light R having the intensity distribution in FIG. 4C, which is obtained by squaring the intensity distribution in FIG. 4B. The feedback light R with the intensity distribution in FIG. 4C reaches the pinhole 8P of the pinhole disk 8 through the reflective mirror 20 and the imaging lens 19.

The feedback light R passing through the pinhole 8P is feedback light R only from the focal surface FS. Accordingly, the microscope device 1 functions as a confocal microscope with a high resolution in the optical axis direction. The feedback light R, which has passed through the pinhole 8P, is reflected by the dichroic mirror 11 and enters the fluorescent filter 14. The fluorescent filter 14 allows only the light in a wavelength range of the fluorescent light from the specimen S to pass through. Accordingly, light other than the fluorescent light is removed from the feedback light R. The feedback light R, which has passed through the fluorescent filter 14, is received on the photo-receiving surface of the camera 16. The camera 16 performs photoelectric conversion of a light amount of the received feedback light R to generate an electrical signal (light amount data). This light amount data is input to the image generating unit 36 through an input unit 25 of the controller 17.

As illustrated in FIG. 1 and FIG. 2, the motor control unit 33 of the controller 17 controls the motor 10. Thus, the microlens disk 7 and the pinhole disk 8 integrally rotate. This allows for scanning of the specimen S with the laser light L at high speed. Therefore, the photo-receiving surface of the camera 16 is scanned at high speed by the feedback light R. This scanning allows for generation of image data in a predetermined area of the predetermined deep portion of the specimen S. This is the first image data. The image generating unit 36 holds the first image data.

Next, the second control is performed. In the second control, the spatial light modulator control unit 34 varies the phase distribution of the spatial light phase modulator 21. In the second control, as illustrated in FIG. 5A, the spatial light modulator control unit 34 controls the spatial light phase modulator 21 to provide a phase that continuously varies from zero to $2\pi$ along the circumferential direction to the laser light L. Subsequently, the laser light source 4 oscillates the laser light L at the second time.

Similarly to the laser light L oscillated at the first time, the laser light L oscillated by the laser light source 4 reaches the spatial light phase modulator 21 through the microlens 7M and the pinhole 8P. The laser light L is operated upon by the spatial light phase modulator 21. The spatial light phase modulator 21 provides a phase difference to the laser light L such that the phase of the laser light L continuously varies from zero to $2\pi$ along the circumferential direction.

The laser light L operated upon by the spatial light phase modulator 21 is focused on the focal point F at the predetermined depth of the specimen S by the objective lens 22. At this time, phases of components of the laser light L opposed to each other with respect to the optical axis are shifted by $\pi$. In view of this, the intensity of the laser light L becomes low near the center of the optical axis on the focal surface FS by interference. In contrast, the phase difference of the laser light L varies from $\pi$ toward zero or $2\pi$ in the separating direction from the center of the optical axis. In a circular position separated from the center of the optical axis at certain distance, the phase difference of the laser light L becomes zero or $2\pi$. In this position, the intensity of the laser light L becomes high by interference. Such interference of the laser light L (excitation light) in accordance with phase variation significantly occurs on the focal surface FS.

In view of this, the intensity distribution of the laser light L in the focal point F of the specimen S becomes as illustrated in FIG. 5B. Fluorescent light is evenly emitted near the focal point of the laser light of the specimen S. This fluorescent light is assumed to function as the feedback light R. In this case, this feedback light R is also operated upon by the spatial light phase modulator 21. Phases of components of the feedback light R opposed to each other with respect to the optical axis are shifted by $\pi$. In view of this, the intensity of the feedback light R becomes low in the pinhole 8P near the center of the optical axis on the focal surface FS by interference. In contrast, the phase difference of the feedback light R varies from $\pi$ toward zero or $2\pi$ in the separating direction from the center of the optical axis. In a circular position separated from the center of the optical axis at certain distance, the phase difference of the feedback light R in the pinhole 8P becomes zero or $2\pi$. The intensity of the feedback light R from this position becomes high by interference. Accordingly, fluorescent light is evenly emitted near the focal point. When this fluorescent light functions as the feedback light R, the intensity distribution of the feedback light R that reaches the pinhole 8P becomes as illustrated in FIG. 5B by influence of interference similarly to the laser light L. Such interference of the fluorescent light significantly occurs in fluorescent light that is emitted from near the focal point F and forms an image in the pinhole 8P.

Therefore, the intensity distribution of the feedback light R, which is obtained by irradiating the specimen S with the laser light L, from near the focal point is the square of the intensity distribution in FIG. 5B. This intensity distribution is illustrated in FIG. 5C. This feedback light R is received on the photo-receiving surface of the camera 16 similarly to the feedback light R in the first control. A light amount of the feedback light R is processed by photoelectric conversion and then input to the input unit 25 as the light amount data. Similarly to the first control, the microlens disk 7 and the pinhole disk 8 integrally rotate. In view of this, the focal surface (planar surface approximately perpendicular to the optical axis) FS of the specimen S is scanned by the laser light L at high speed. The photo-receiving surface of the camera 16 is scanned by the feedback light R at high speed.

Figure 6:
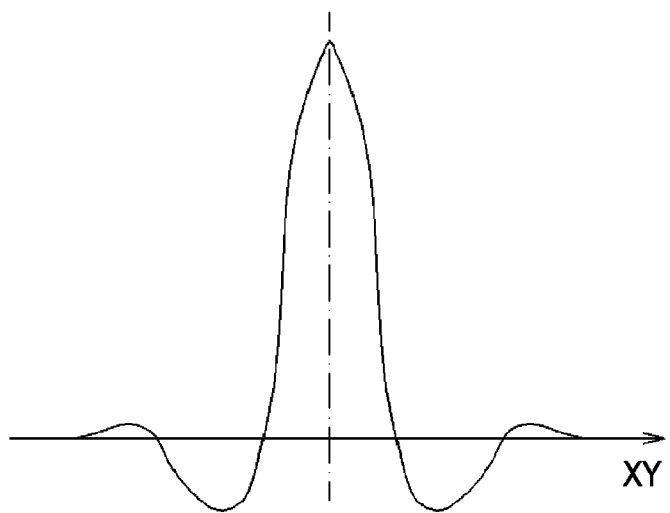
FIG. 6 is a diagram illustrating intensity distribution obtained by difference operation.

Such scanning allows for generation of image data of a predetermined area in a predetermined deep portion of the specimen S. This is the second image data. The image generating unit 36 operates a difference between the first image data and the second image data. The first image data has the distribution illustrated in FIG. 4C. The second image data has the distribution illustrated in FIG. 5C. Operating the difference between these allows for acquisition of intensity distribution (point spread) as illustrated in FIG. 6. This intensity distribution has narrower width than that of ordinary intensity distribution. In view of this, a resolution in the XY direction is high. Additionally, the interference of the laser light (excitation light), which occurs when obtaining the second image, significantly occurs on the focal surface FS. Interference significantly occurs in fluorescent light that is emitted from the focal surface FS and passes through the pinhole 8P among fluorescent light in the feedback light. With these effects, operating the difference between images allows for extraction of information of the focal surface FS with high sensitivity. This generates image data of the predetermined area in the predetermined deep portion of the specimen S.

Accordingly, an image of the specimen S can be generated by varying the phase distribution of the spatial light phase modulator 21 and obtaining the first image data and the second image data, and by operating the difference between these image data. As described above, the controller 17 is a computer operated by software. In view of this, the computer can have functions of the respective units 31 to 36 in FIG. 3. This consequently allows for observation of the deep portion of the specimen S without any special circuit such as a band-pass filter.

The first image data and the second image data are mixed with the component (stray light component) caused by fluorescent light (stray light that gets through the pinhole 8P by scattering and similar cause) emitted from other portions than the focal surface FS. This stray light component causes deterioration of the image data. Operating the difference between the first image data and the second image data can remove the stray light component from the image data. That is, the stray light component mixed into the first image data and the second image data can be cancelled by operating the difference between the both image data. This consequently allows for accurate observation of the deep portion of the specimen S.

The observation of the deep portion that employs frequency modulation like the technique in JP-A-2010-197986 stops scanning with the laser light for a certain period of time. In contrast, in this embodiment, the spatial light phase modulator 21 varies the phase distribution of the laser light L to obtain the first image data and the second image data. Subsequently, the difference between these image data is operated to generate the image. This eliminates the need for stopping scanning with the laser light L. This allows for generation of the image data for observing the deep portion of the specimen S at high speed. Additionally, the microscope device 1 according to this embodiment is a Nipkow disk confocal microscope. Therefore, the image (image data) can be generated at high speed.

Figure 7:
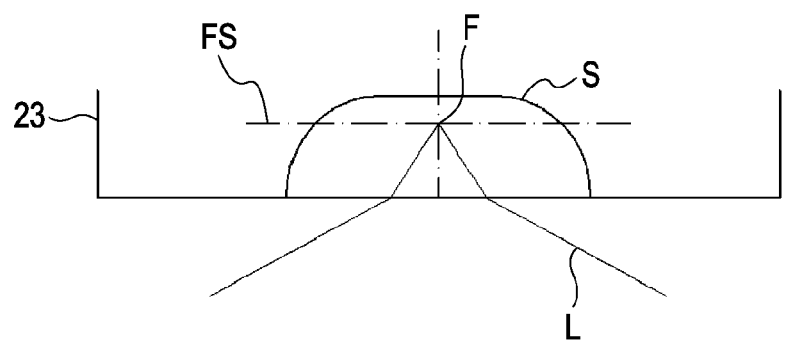
FIG. 7 is a diagram illustrating laser light L applied on a specimen S.

As illustrated in FIG. 7, a refractive index of a medium (that is, a medium between the objective lens 22 and the dish 23, which is air) before the light reaches the specimen S and a refractive index (that is, a refractive index of the specimen S) of a medium inside of the specimen S are mutually different. This difference in the refractive index generates spherical aberration in the laser light L. This aberration deteriorates the image.

As described above, the spatial light phase modulator 21 can control the phases of the laser light L and the feedback light R. Accordingly, the spatial light phase modulator 21 can also vary the phase of the laser light L from zero to $2\pi$ along the circumferential direction, and can provide phase distribution that corrects the spherical aberration to the laser light L and/or the feedback light R. Accordingly, the spherical aberration based on the difference in the above-mentioned refractive index is corrected. Therefore, a clear image can be obtained.

Figure 8A:
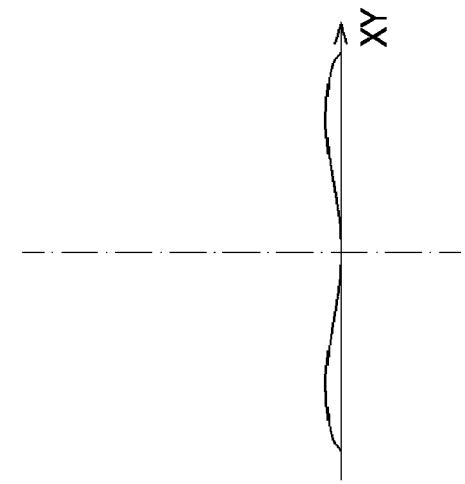
FIG. 8A is a diagram illustrating phase distribution in second control according to Modification 1.

Next, Modification 1 will be described. In Modification 1, when generating the second image data (that is, when performing the second control), the spatial light phase modulator 21 employs distribution as illustrated in FIG. 8A. This distribution has phase distribution of the laser light L and the feedback light R in the cross section of the optical path where a region with a phase of zero and a region with a phase of $\pi$ are alternately arranged along the circumferential direction.

Figure 8B:
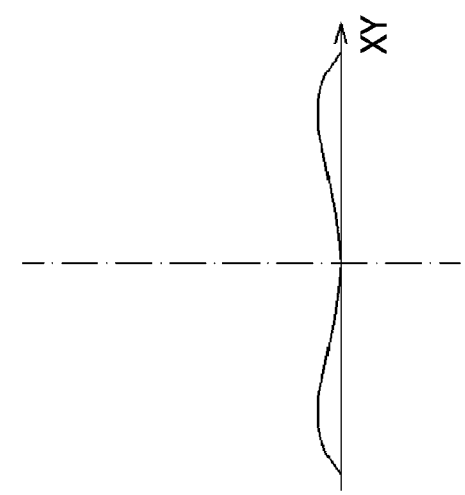
FIG. 8B is a diagram illustrating intensity distribution in the second control according to Modification 1.
Figure 8C:
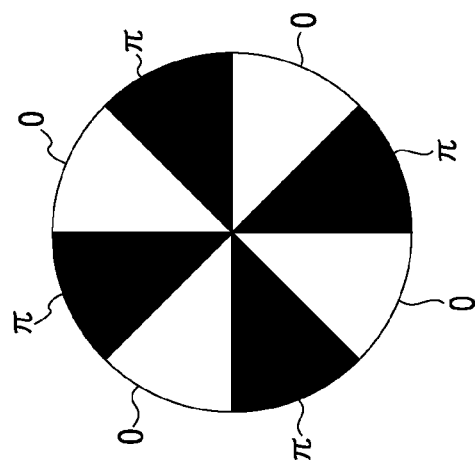
FIG. 8C is a diagram illustrating intensity distribution in the second control according to Modification 1.

In Modification 1, the rays of light with inverted phases overlap together adjacent to the focal point. Accordingly, the intensity of the laser light (excitation light) becomes low by interference. At this time, the rays of light with different phases almost cancel each other inside of the XY plane adjacent to the focal point. In view of this, the intensity distribution becomes as illustrated in FIG. 8B. Similarly, the rays of feedback light (fluorescent light) R from the focal point almost cancel each other in the pinhole 8P. Therefore, the laser light L and the feedback light R, which have such intensity distribution, are multiplied. Thus, intensity distribution of the feedback light R received by the camera 16 becomes low as illustrated in FIG. 8C. This cancelling of the laser light (excitation light) by interference significantly occurs on the focal surface FS. Also, this cancelling of the feedback light R by interference significantly occurs in the fluorescent light that is emitted from the focal surface FS and passes through the pinhole 8P.

Therefore, operating a difference between the first image data and the second image data of this modification allows for extraction of information of the focal surface FS with high sensitivity. Therefore, the deep portion of the specimen S can be observed. Also, operating the difference between the first image data and the second image data allows for removal of a stray light component from the image data. Additionally, this eliminates the need for stopping scanning with the laser light L, thus generating the image at high speed.

The aforementioned embodiment and this Modification 1 disclose an exemplary pattern of the phase distribution provided by the spatial light phase modulator 21. These patterns of phase distribution cause interference of the laser light L, which is condensed by the objective lens 22, in the focal point F. The deep portion of the specimen S can be observed by varying the patterns of phase distribution using the first control and the second control and obtaining the first image data and the second image data, and by operating the difference between the first image data and the second image data.

In the aforementioned embodiment and Modification 1, the phase distribution of the laser light L employs uniform phase distribution in the first control. However, in order to observe the deep portion of the specimen S accurately, any other configuration is possible insofar as the phase distribution of the laser light L in the first control and the phase distribution of the laser light L in the second control are different from each other. Accordingly, in the first control, the spatial light phase modulator 21 may have phase distribution of the laser light L, which is different from the uniform phase distribution.

Next, Modification 2 will be described. In the aforementioned embodiment and Modification 1, the image (image data) is generated to improve the resolution in the XY direction (that is, the planar surface perpendicular to the optical axis) in the specimen S. In Modification 2, the image is generated to improve a resolution in the Z direction (that is, the optical axis direction). The microscope device 1 according to Modification 2 includes the spatial light phase modulator 21 with a different configuration from that in FIG. 1.

Also in Modification 2, the laser light is applied twice. That is, the first control and the second control are performed. In the first control, the spatial light phase modulator 21 has phase distribution of the laser light L, which is uniform phase distribution as illustrated in FIG. 9A. In this case, the intensity distribution of the laser light L in the focal point F follows the point spread function of the objective lens 22. That is, the laser light L has intensity distribution as illustrated in FIG. 9B. The spatial light phase modulator 21 affects both the laser light L and the feedback light R. In view of this, intensity distribution of the feedback light R that reaches the pinhole 8P becomes intensity distribution obtained by squaring the distribution in FIG. 9B as illustrated in FIG. 9C.

Subsequently, in the second control, the spatial light phase modulator 21 varies the phase distribution of the laser light L to have phase distribution illustrated in FIG. 10A. In this phase distribution, a phase difference in the center region in a circular shape is $\pi$ while a phase difference in a ring region that is a peripheral region of this circular shape is zero.

The laser light L that has passed through the spatial light phase modulator 21 is condensed by the objective lens 22, and is focused on a focal point on the focal surface FS. In the center of the optical axis on the focal surface FS, the component with the phase of zero and the component with the phase of $\pi$ interfere with each other in the laser light L. This makes the intensity of the laser light L low. In contrast, the intensity of the laser light L becomes higher in the separating direction from the center of the optical axis. In the portion where the phase difference becomes zero or $2\pi$, the intensity of the laser light L becomes highest by interference. In view of this, the intensity distribution of the laser light L becomes intensity distribution illustrated in FIG. 10B.

The spatial light phase modulator 21 affects the both the laser light L and the feedback light R. Therefore, the intensity distribution of the feedback light R that has reached the pinhole 8P becomes intensity distribution obtained by squaring the intensity distribution in FIG. 10B as illustrated in FIG. 10C. This feedback light R is received in the camera 16. The light amount of the feedback light R is processed by photoelectric conversion to be the second image data.

Figure 11:
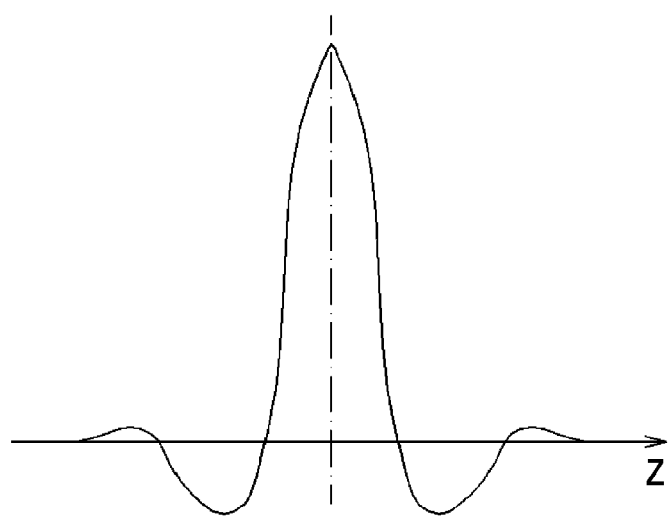
FIG. 11 is a diagram illustrating intensity distribution obtained by difference operation according to Modification 2.

The image generating unit 36 operates the difference between the first image data and the second image data. Accordingly, the image generating unit 36 generates the image data of a predetermined deep portion of the specimen S. FIG. 11 illustrates intensity distribution of the image data that is obtained as the difference between the first image data and the second image data. This intensity distribution provides a high resolution in the Z direction. Operating the difference between the first image data and the second image data allows for removal of a stray light component from the image data in the observation of the deep portion. This also eliminates the need for stopping scanning with the laser light L, thus generating an image at high speed.

Figure 12:
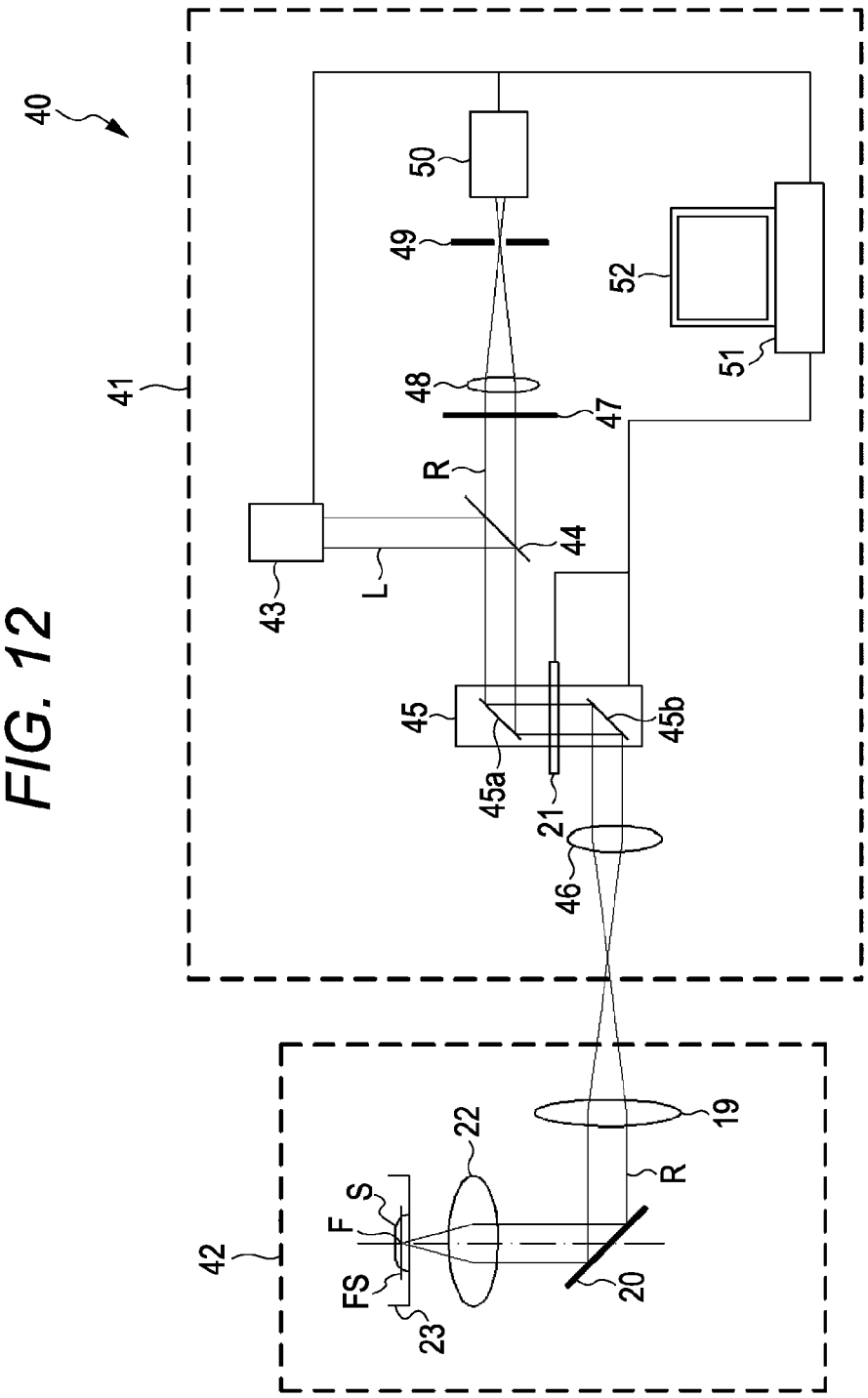
FIG. 12 is a schematic configuration diagram of a microscope device according to Modification 3.

Next, Modification 3 will be described. FIG. 12 illustrates a microscope device 40 according to Modification 3. The microscope device 1 illustrated in FIG. 1 is a Nipkow disk confocal microscope. The microscope device 40 according to Modification 3 is a mirror scanning microscope device. This mirror scanning microscope device 40 includes a scanning optical system 41 and a microscope optical system 42. In these members, the microscope optical system 42 does not include the spatial light phase modulator 21, and is otherwise similar to the microscope optical system 3 in the microscope device 1.

As illustrated in FIG. 12, the scanning optical system 41 includes a laser light source 43, a dichroic mirror 44, a scanning optical system unit 45, a pupil relay lens 46, a fluorescent filter 47, a convergence lens 48, a pinhole 49, a detector 50, a controller 51, and a display 52.

The laser light source 43 oscillates and outputs laser light L. This laser light L excites the specimen S to emit fluorescent light. The laser light L is reflected by the dichroic mirror 44 to be introduced into the scanning optical system unit 45. The scanning optical system unit 45 includes a first variable mirror 45a and a second variable mirror 45b that are rotatable around one axis. The spatial light phase modulator 21 is disposed between the first variable mirror 45a and the second variable mirror 45b.

The scanning optical system unit 45 adjusts angles of the first variable mirror 45a and the second variable mirror 45b to scan the specimen S with the laser light L. On an optical path of the laser light L reflected by the second variable mirror 45b, the pupil relay lens 46 is disposed. The laser light L converged by the pupil relay lens 46 enters the imaging lens 19, and is reflected by the reflective mirror 20. Subsequently, the laser light L is focused on the focal point F in the specimen S by the objective lens 22.

The laser light L is focused on the focal point F in the specimen S. Thus, fluorescent light is emitted from the specimen S. This fluorescent light enters the objective lens 22 as feedback light R. The feedback light R is reflected by the reflective mirror 20 after being converted into collimated light by the objective lens 22. Subsequently, the feedback light R enters the dichroic mirror 44 through the imaging lens 19, the pupil relay lens 46, and the scanning optical system unit 45.

The dichroic mirror 44 reflects light in a wavelength range of the laser light L while transmitting light in a wavelength range of the feedback light R. The feedback light R that has passed through the dichroic mirror 44 enters the fluorescent filter 47. The fluorescent filter 47 removes light at a wavelength other than the fluorescent light component from the feedback light R. The feedback light R that has passed through the fluorescent filter 47 enters the convergence lens 48. The feedback light R is converged by the convergence lens 48, and then passes through the pinhole 49. Accordingly, the light that is from other portions than the focal surface is removed from the feedback light R. With this configuration, the microscope device 40 can function as a confocal microscope with a high resolution in the optical axis direction.

The feedback light R that has passed through the pinhole 49 enters the detector 50. The detector 50 performs photoelectric conversion on a light amount of the feedback light R so as to generate light amount data and output it to the controller 51. The controller 51 has a configuration almost similar to that of the controller 17 in FIG. 3. However, the controller 51 does not include the motor control unit 33 while the controller 51 includes a control unit for a scanning optical system unit (not shown) for controlling the scanning optical system unit 45.

This allows the scanning optical system unit 45 to scan a predetermined area of the specimen S. The spatial light phase modulator 21 in Modification 3 is disposed between the first variable mirror 45a and the second variable mirror 45b. The pupil relay lens 46, which converges light, is disposed on the optical path. Accordingly, a pupil of the objective lens 22 is relayed to a position adjacent to the spatial light phase modulator 21.

Figure 10A:
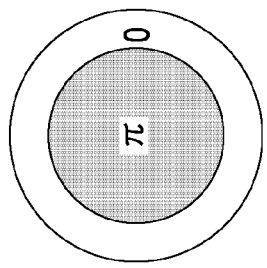
FIG. 10A is a diagram illustrating phase distribution in second control according to Modification 2.
Figure 10B:
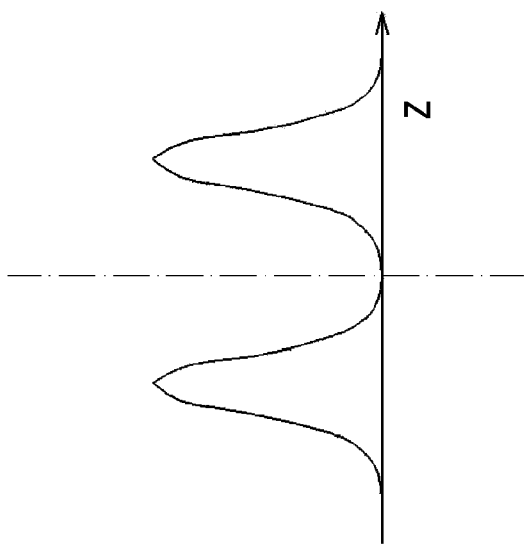
FIG. 10B is a diagram illustrating intensity distribution in the second control according to Modification 2.
Figure 10C:
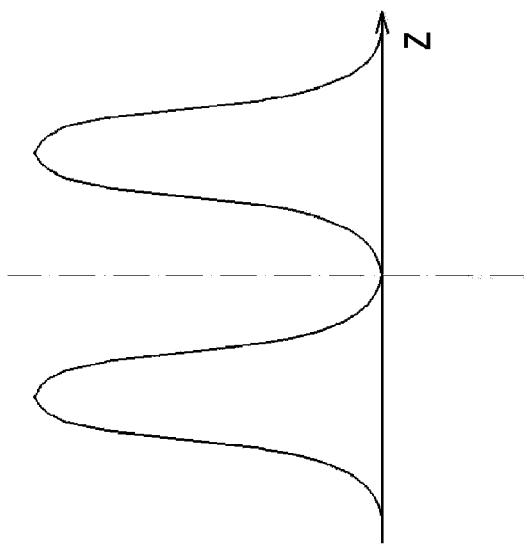
FIG. 10C is a diagram illustrating intensity distribution in the second control according to Modification 2.

As the spatial light phase modulator 21, a spatial light modulator that provides any phase distribution to the laser light L and the feedback light R as illustrated in FIG. 5A, FIG. 8A, and FIG. 10A can be used. The spatial light phase modulator 21 makes the phase distribution of the laser light L, which is applied on the specimen S, uniform phase distribution in the first control. In contrast, in the second control, the spatial light phase modulator 21 varies the phase distribution of the laser light L applied on the specimen S to have distribution different from the uniform phase distribution.

The controller 51 has almost the same configuration as that of the controller 17 illustrated in FIG. 2. The image generating unit 36 of the controller 51 operates the difference between the first image data and the second image data. The operation result is displayed on the display 18 as image data.

Accordingly, the mirror scanning microscope device 40 can also observe a predetermined deep portion of the specimen S without any special circuit such as a bandpass filter. Operating the difference between the first image data and the second image data allows for removal of the stray light component from the image data. Additionally, also in the microscope device 40, the need for stopping scanning with the laser light L is eliminated, thus generating the image (image data) at high speed.

In Modification 3, the spatial light phase modulator 21 is disposed in the scanning optical system unit 45. This, however, should not be construed in a limiting sense. The spatial light phase modulator 21 may be disposed in any position in the optical paths of the laser light L and the feedback light R. The spatial light phase modulator 21 is preferred to be relayed by the pupil relay lens 46 to a position of the pupil of the objective lens 22 (alternatively, a position equivalent to the pupil including the position of the pupil).

Next, Modification 4 will be described with reference to FIG. 13. A microscope device 60 according to Modification 4 is a Nipkow disk confocal microscope similar to that in the embodiment. The microscope device 60 includes the scanning optical system 2 and a microscope optical system 61. The scanning optical system 2 is the same as that of the microscope device 1 described in the embodiment, and will not be further elaborated here.

The microscope optical system 61 also basically has a configuration similar to that of the microscope optical system 3 of the microscope device 1. However, the microscope optical system 61 includes a reflective spatial light modulator 62 in the position of the reflective mirror 20 illustrated in FIG. 1. The microscope optical system 61 additionally includes a third relay lens 63 and a fourth relay lens 64. The third relay lens 63 and the fourth relay lens 64 lead (relay) a position of the pupil of the objective lens 22 (alternatively, a position equivalent to the pupil including the position of the pupil) to the reflective spatial light modulator 62.

The spatial light modulators 21 in the aforementioned embodiment and Modifications 1 to 3 are transmissive spatial light modulators. The spatial light modulator 62 in Modification 4 is a reflective spatial light modulator. This spatial light modulator 62 varies the phase distribution of the laser light L and the feedback light R. The spatial light modulator 62 varies the phase distribution of the laser light L between in the first control and in the second control. Operating the difference between the first image data and the second image data respectively obtained by the first control and the second control allows for acquisition of the image data in the predetermined deep portion of the specimen S.

Figure 13:
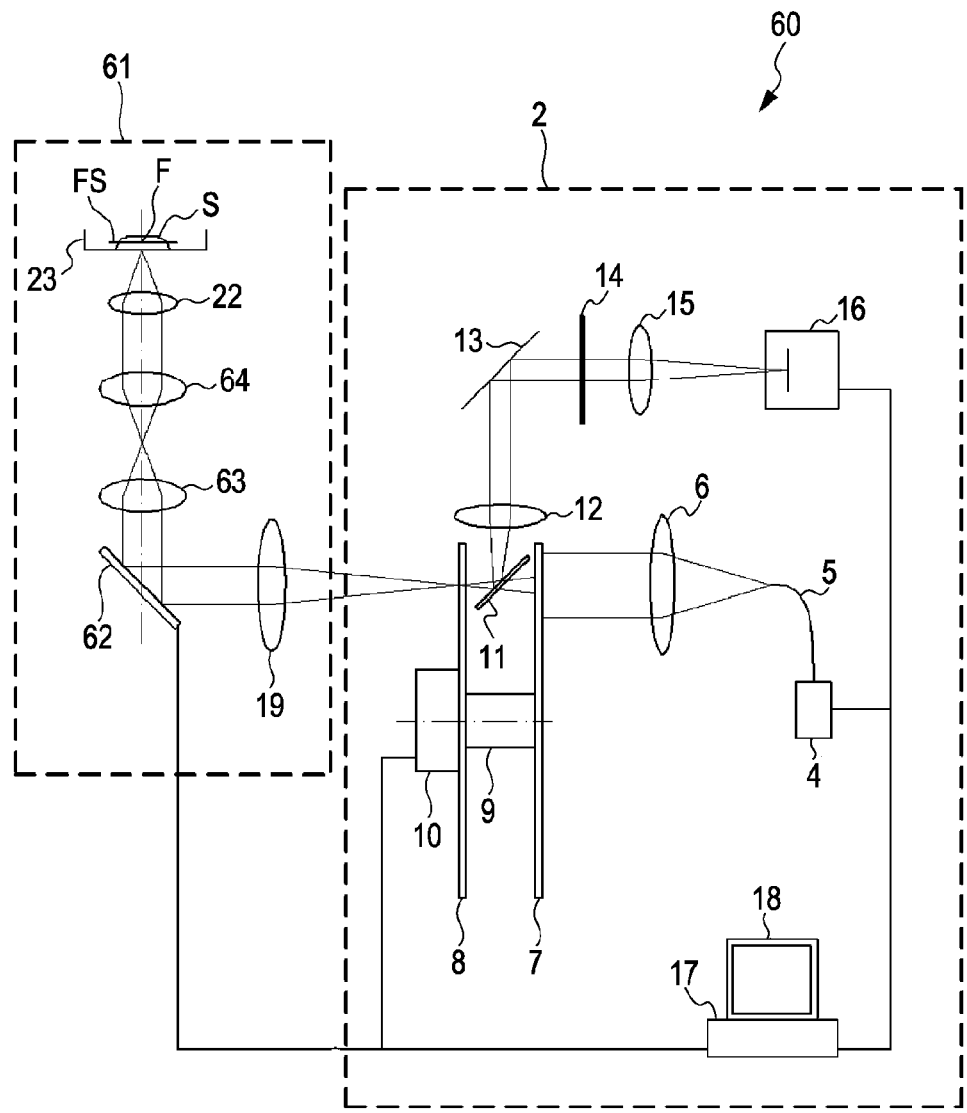
FIG. 13 is a schematic configuration diagram of a microscope device according to Modification 4.

As illustrated in FIG. 13, the optical path of the laser light L that has entered the microscope optical system 61 from the scanning optical system 2 is bent approximately at 90 degrees. Accordingly, the microscope device 1 illustrated in FIG. 1 employs the reflective mirror 20. In Modification 4, the reflective spatial light modulator 62 can function as the reflective mirror 20. Therefore, the number of components in the microscope optical system 61 can be reduced for the reflective mirror 20.

Next, Modification 5 will be described with reference to FIG. 14. A microscope device 70 according to Modification 5 includes the microscope optical system 3 similar to that of the microscope device 1 of the embodiment. The microscope device 70 includes a focus projection optical system 71 and the microscope optical system 3. The microscope optical system 3 is the same as that of the microscope device 1 described in the embodiment, and will not be further elaborated here.

The focus projection optical system 71 includes a laser light source 72, an optical fiber 73, a collimator lens 74, a pinhole array 75, a dichroic mirror 76, a fluorescent filter 77, a camera 78, a controller 79, and a display 80.

The laser light source 72 oscillates coherent laser light L (illuminating light) similarly to the laser light source 4 of the microscope device 1. The laser light L has a wavelength that makes the specimen (such as a living body) S irradiated with the laser light L emit fluorescent light. The laser light L is introduced into the collimator lens 74 by the optical fiber 73, and then is converted into collimated light.

Figure 15:
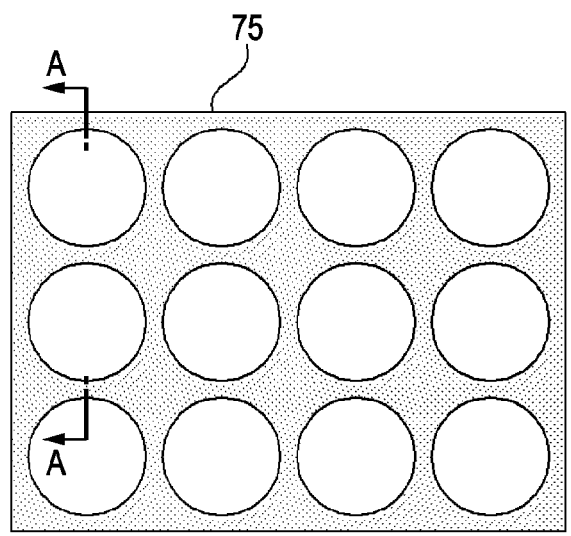
FIG. 15 is a diagram illustrating a concrete example of a pinhole array used in Modification 5.
Figure 16:
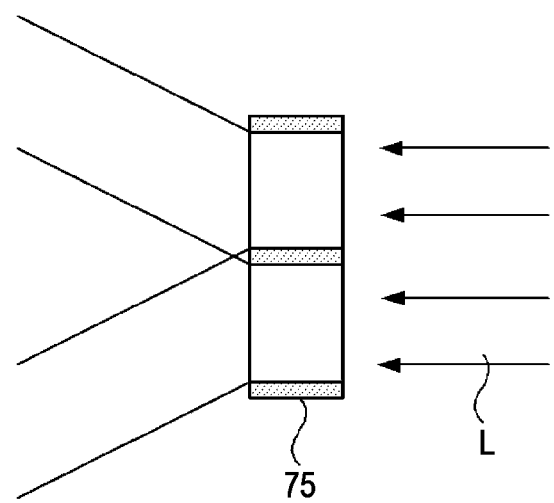
FIG. 16 is a cross-sectional view of the pinhole array taken along the arrow A-A in FIG. 15.

The laser light L emitted from the collimator lens 74 enters the pinhole array 75. For example, pinholes with a diameter of 5 μm are arranged at a pitch of 6 μm in a part of the pinhole array 75 as illustrated in FIG. 15. FIG. 16 is a cross-sectional view of the pinhole array 75 taken along the arrow A-A of FIG. 15. Hatched portions in FIGS. 15 and 16 are portions that block light. Portions without hatching (pinholes) transmit light.

The dichroic mirror 76 is disposed at a downstream side of the pinhole array 75 in the optical path of the laser light L. The dichroic mirror 76 transmits light in a wavelength range of the laser light L while the dichroic mirror 76 reflects light in a wavelength range of the feedback light R including fluorescent light from the specimen S.

The fluorescent filter 77 is disposed in the optical path of the feedback light R. The fluorescent filter 77 allows only the light in the wavelength range of the fluorescent light from the specimen S to pass through. The feedback light R that has passed through the fluorescent filter 77 is received by the camera 78. The camera 78 has a photo-receiving surface. The camera 78 functions as a detecting unit that performs photoelectric conversion of the light amount of the feedback light R so as to generate an electrical signal (light amount data). This electrical signal is output to the controller 79.

The controller 79 generates and stores image data of the deep portion of the specimen S based on the input electrical signal. The controller 79 and the display 80 are similar to the controller 17 and the display 18 of the microscope device 1, and will not be further elaborated here.

Next, operation of the microscope device 70 will be described. As described above, the laser light L is oscillated at least twice. Hereinafter, the light source control unit 32 (see FIG. 3) of the controller 79 is assumed to control the laser light source 72 to oscillate the laser light L twice. As described above, the control for obtaining the first image data using the laser light L oscillated at the first time is assumed to be first control. The control for obtaining the second image data using the laser light L oscillated at the second time is assumed to be second control.

At the first time (first control), the spatial light modulator control unit 34 (see FIG. 3), which is disposed in the controller 79, controls the spatial light phase modulator 21 such that the whole light that passes through the spatial light phase modulator 21 has a uniform phase. In view of this, the phase distribution of the laser light L and the feedback light R is uniform phase distribution.

The laser light L is guided to the collimator lens 74 through the optical fiber 73, and converted into collimated light. This collimated light is introduced to the pinhole array 75, and is diffracted by the respective pinholes. This converts the collimated light into diverging light. FIG. 14 illustrates light near the center of the optical axis among the diverging light, using a solid line. In contrast, light in a peripheral edge portion is illustrated by a dashed line. These rays of laser light L pass through the dichroic mirror 76, and enter the imaging lens 19. Subsequently, the optical paths of the rays of laser light L are bent approximately at 90 degrees by the reflective mirror 20. The rays of laser light L then enter the spatial light phase modulator 21.

As described above, the spatial light phase modulator 21 controls the rays of laser light L to have uniform phase distribution. Accordingly, the rays of laser light L have uniform phases in all areas.

The rays of laser light L with the phases controlled by the spatial light phase modulator 21 are focused on the focal point F by the objective lens 22. The rays of laser light L that have passed through the pinhole array 75 enter the focal surface FS. Accordingly, a plurality of focal points is projected on the focal surface FS.

The objective lens 22 has, for example, magnification of 40 times and an NA of 0.95. Intensity distribution of the laser light L in the XY plane including the focal point F of the specimen S follows a point spread function (PSF) of the objective lens 22. This objective lens 22 has an Airy disk radius of approximately 0.31 μm in the case where the wavelength of the laser light L is 488 nm.

In contrast, the pitch of the pinhole array 75 (6 μm) is reduced to 1/40 in the focal surface FS. In view of this, a pitch of the light projected on the focal surface FS becomes 0.15 μm. Therefore, areas of rays of light that have passed through the different pinhole arrays 75 (focus areas) on the focal surface FS partially overlap each other. Intensity distribution of the respective rays of light on the focal surface FS is illustrated by dashed lines in FIG. 17. Additionally, these rays of light have approximately uniform phases, thus strengthening each other. These rays of light provide intensity distribution as illustrated by a solid line.

When these rays of light excite the specimen S, fluorescent light is emitted from the specimen S. This fluorescent light enters the objective lens 22 as feedback light R again. The feedback light R converted into collimated light by the objective lens 22 enters the spatial light phase modulator 21. This feedback light R passes through the spatial light phase modulator 21 while having the uniform phase, passes through the reflective mirror 20 and the imaging lens 19, and is reflected by the dichroic mirror 76. Then, the feedback light R passes through the fluorescent filter 77. Accordingly, light other than a fluorescent light component is removed from the feedback light R.

The feedback light R that has passed through the fluorescent filter 77 is received on the photo-receiving surface of the camera 78. The camera 78 performs photoelectric conversion of the light amount of the received feedback light R, thus generating an electrical signal (light amount data). This light amount data is input to the image generating unit 36 (see FIG. 3) from the input unit 25 of the controller 79.

Figure 17:
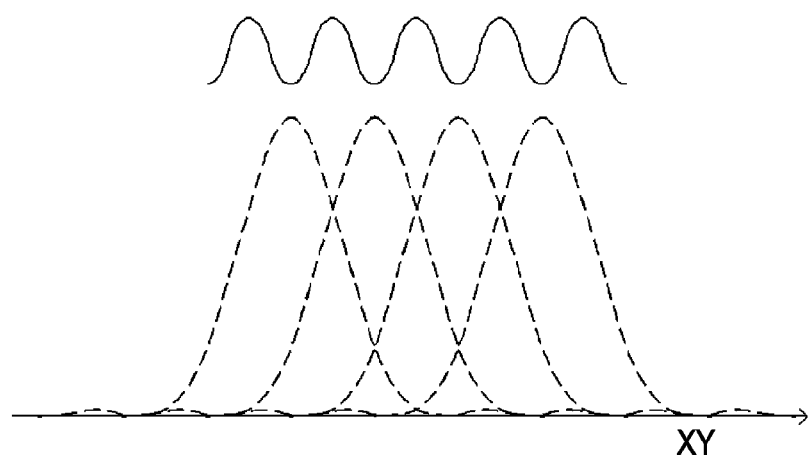
FIG. 17 is a diagram illustrating intensity distribution obtained using the pinhole array according to Modification 5.

For example, a pitch of the imaging elements of the camera 78 is 6 µm. As illustrated in FIG. 17, the laser light L (illuminating light) on the focal surface FS is not uniform, and has periodic intensity distribution. The fluorescent light obtained from the laser light L with the periodic intensity distribution has a pitch of 0.15 µm on the focal surface FS. This pitch extends by influence of point spread of an imaging optical system. The fluorescent light enters the imaging elements of the camera 78 at a pitch of 6 µm. In view of this, the pitch of the fluorescent light projected to the imaging elements is almost equivalent to a pixel pitch of the imaging elements. Accordingly, when the pitch of the imaging elements is almost equivalent to the pitch of the periodic laser light L, the periodic feedback light R is averaged on the imaging elements. In view of this, the influence of the periodicity of the laser light L is small.

An optical low-pass filter may be inserted into a front surface of the camera 78. This reduces influence of moire that may occur due to a small difference between the pitch of the imaging elements and the pitch of the periodic laser light L.

Figure 18:
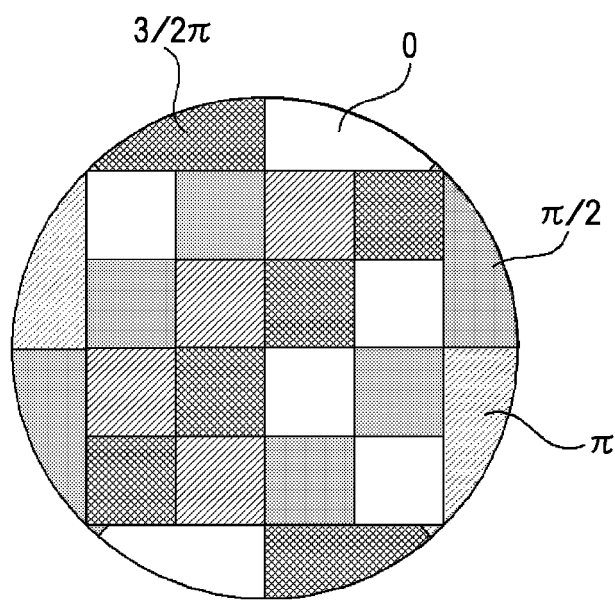
FIG. 18 is a diagram illustrating phase distribution of a spatial light modulator used in Modification 5.

Next, the second control is performed. The spatial light modulator control unit 34 (see FIG. 3) of the controller 79 varies the phase distribution of the spatial light phase modulator 21. In this modification, the spatial light modulator control unit 34 has the spatial light phase modulator 21 that is separated into small areas as illustrated in FIG. 18. The spatial light modulator control unit 34 controls the spatial light phase modulator 21 to provide the laser light L with four types of phases from zero to $3/2\pi$ for respective areas. Subsequently, the laser light source 72 oscillates the laser light L at the second time.

Similar to the laser light L oscillated at the first time, the laser light L oscillated by the laser light source 72 reaches the spatial light phase modulator 21. This laser light L is operated upon by the spatial light phase modulator 21.

The laser light L operated upon by the spatial light phase modulator 21 is focused on the focal point F in the predetermined depth of the specimen S by the objective lens 22. At this time, components of phases of the laser light L interfere with each other adjacent to the focal point F. This cancels the laser light L adjacent to the focal point F. Therefore, the fluorescent light is not emitted from near the focal surface FS.

The feedback light R from the specimen S is received on the photo-receiving surface of the camera 78 similarly to the feedback light R in the first control. Here, even if the fluorescent light is emitted from the focal surface FS, this fluorescent light is cancelled on the imaging elements of the camera 78 by the operation of the spatial light phase modulator 21. The laser light L and the feedback light R are operated upon by the spatial light phase modulator 21 as described above. This cancels the feedback light R (fluorescent light) from the focal surface FS.

The light amount of the feedback light R is processed by photoelectric conversion using the camera 78 to be input to the input unit 25 (see FIG. 3) of the controller 79 as the light amount data. This is the second image data.

When obtaining the first and the second image data, the laser light L or the feedback light R may be also interfered with on other portions than the focal surface FS. However, the intensity of the light rapidly becomes lower in the separating direction from the focal point. Additionally, a plurality of rays of light overlaps one another, thus averaging the intensity. In view of this, the aforementioned interference has subtle influence.

In Modification 5, the phase distribution of the light has segmentalized patterns. Additionally, the light has the four types of phases. In view of this, a pattern of possible interference varies depending on a position. Accordingly, the influence of the interference of the light is averaged even in a position that is comparatively close to the focal surface FS. Accordingly, the interference of the light has smaller influence on the image.

The image generating unit 36 (see FIG. 3) of the controller 79 operates the difference between the first image data and the second image data. The second image data is the image data without information of the fluorescent light adjacent to the focal surface FS. In view of this, calculating the difference allows for extraction of only the information of the fluorescent light adjacent to the focal surface FS. That is, this allows for acquisition of an image similar to a confocal image. Accordingly, the image data in a predetermined area of a predetermined deep portion of the specimen S is generated.

In Modification 5, the scanning optical system is not necessary. This ensures imaging at higher speed. In addition, in Modification 5, the specimen S is irradiated with the laser light almost constantly when performing imaging. This ensures lower intensity of the laser light on the specimen per unit hour compared with a case where the specimen S is intermittently irradiated with the laser light using the scanning optical system. Therefore, the specimen such as a cell is not easily damaged. Also, discoloration of the fluorescent pigment can be reduced.

The image obtained by the first control is the image equivalent to an ordinary epifluorescence image. Therefore, the epifluorescence image can be obtained at the same time.

Figure 14:
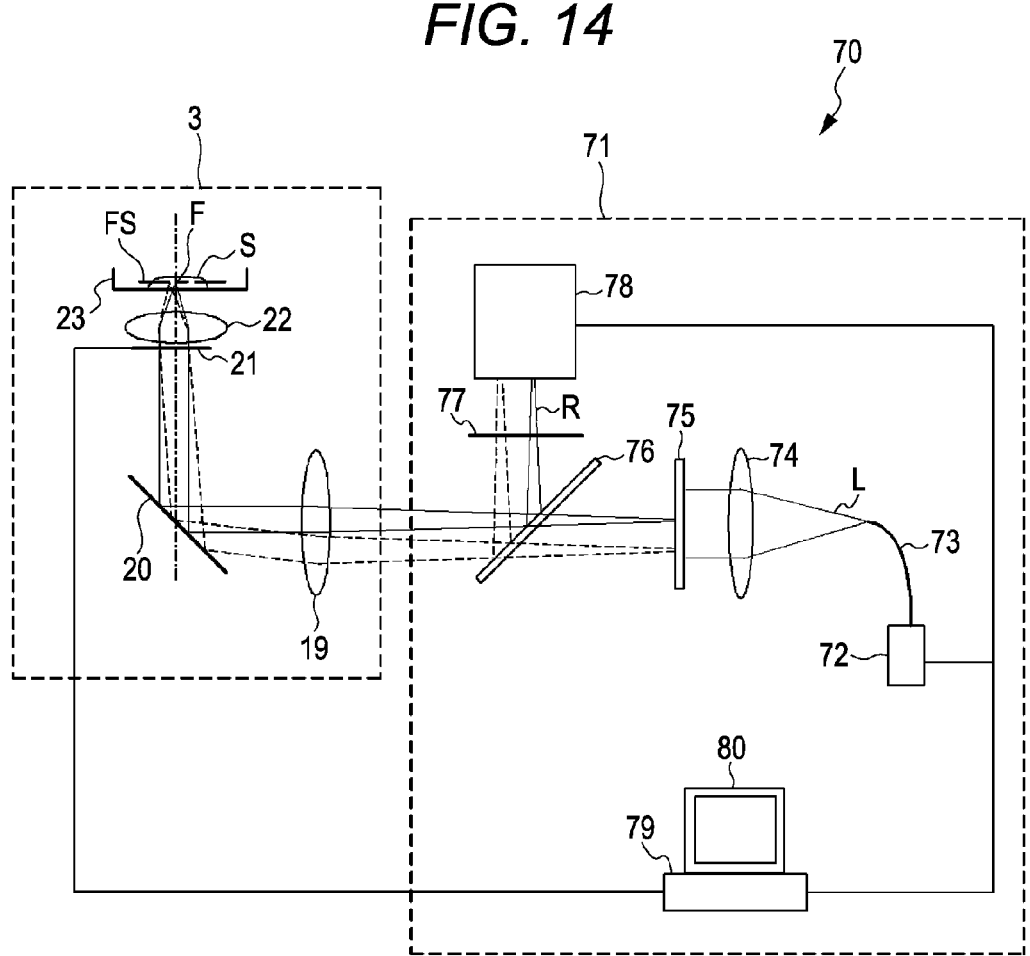
FIG. 14 is a schematic configuration diagram of a microscope device according to Modification 5.
Figure 19:
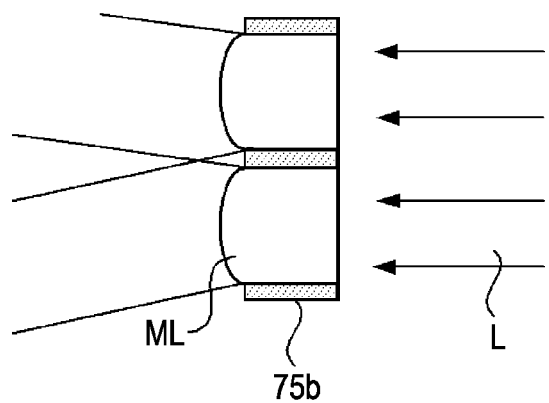
FIG. 19 is a modification diagram of the pinhole array used in Modification 5.

FIG. 19 illustrates a modification of the pinhole array 75 that is used in the microscope device 70 illustrated in FIG. 14. A pinhole array 75a in FIG. 16 provides a larger diffraction angle when the pinhole diameter is approximately 5 µm. In view of this, the light might not reach a part of the pupil of the objective lens 22. A pinhole array 75b in FIG. 19 has an emitting surface of the pinhole where a microlens ML is disposed. Most divergence angles of the laser light have angles to enter the pupil of the objective lens 22. Thus, the pinhole array 75b allows for use of the laser light more efficiently than the pinhole array 75a in FIG. 16.

Figure 20:
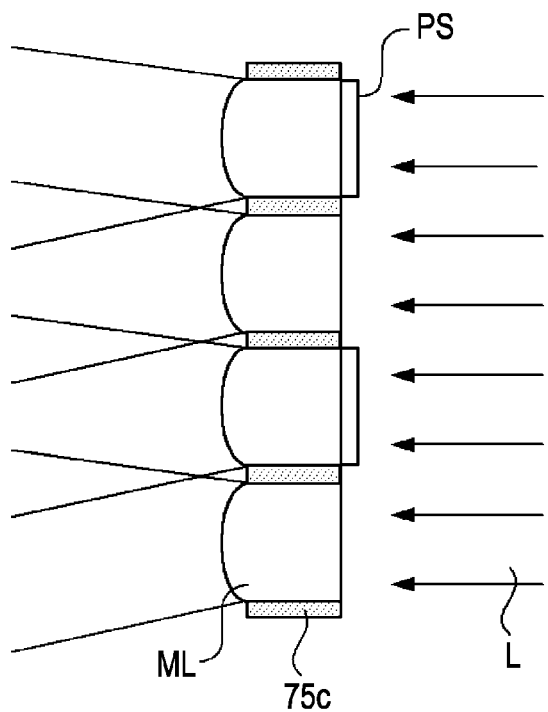
FIG. 20 is a modification diagram of the pinhole array used in Modification 5.

FIG. 20 also illustrates a modification of the pinhole array 75 that is used in the microscope device 70 illustrated in FIG. 14. A pinhole array 75c in FIG. 20 has an emitting surface of the pinhole where a microlens (optical element with lens effect) ML is disposed, similarly to the pinhole array 75b in FIG. 19. Additionally, a phase shift film (phase shifting unit)

PS is disposed on the emitting surface of the every two pinholes. The phase shift film PS shifts a phase of light by $\pi$. The microlens ML is configured to optimize the divergence angle of the laser light similarly to that in FIG. 19.

The pinhole array 75c in FIG. 20 has a pinhole diameter of, for example, 10 μm. The pinhole pitch is, for example, 12 μm. In this case, the objective lens 22 has, for example, magnification of 100 times and an NA of 1.4. The objective lens 22 has an Airy disk radius of approximately 0.21 μm in the case where the wavelength of the laser light L is 488 nm.

In contrast, the pitch of the pinhole array 75 (12 μm) is reduced to 1/100 in the focal surface FS. In view of this, a pitch of the light projected on the focal surface FS becomes 0.12 μm. A pixel size of the camera 78 is, for example, 4 μm. Therefore, focus areas of the rays of light that have passed through the different pinhole arrays 75 on the focal surface FS partially overlap each other.

Figure 21:
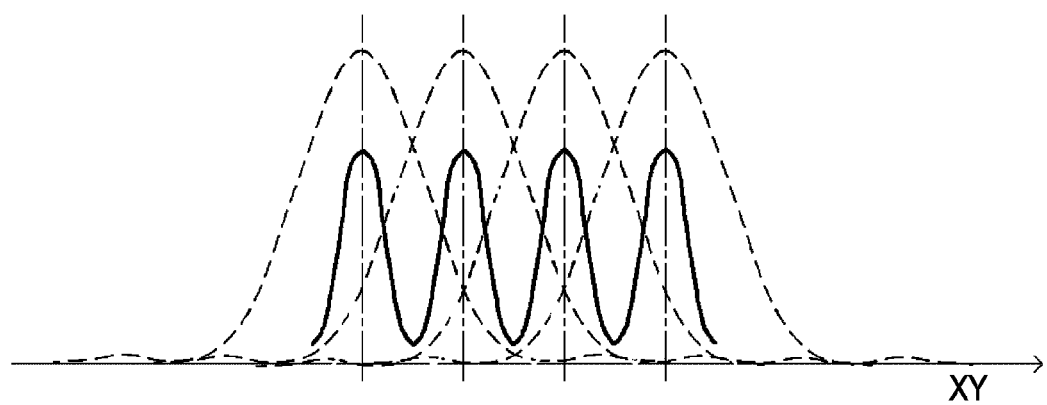
FIG. 21 is a diagram illustrating intensity distribution of illuminating light obtained using another pinhole array.
Figure 22:
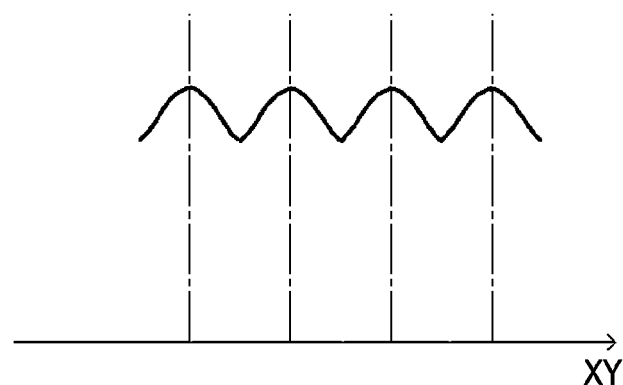
FIG. 22 is a distribution diagram of fluorescent light on a photo-receiving surface of a camera.

When imaging in the first control is performed, phases of two rays of light with adjacent focal points are shifted by $\pi$. In view of this, these rays of light cancel each other. Accordingly, the intensity distribution of the laser light L (illuminating light) becomes as illustrated by a solid line in FIG. 21. When imaging a fluorescent material placed in a position where the illuminating light has an apex of intensity, the fluorescent light extends by influence of point spread in the imaging optical system. The fluorescent light shows distribution on the photo-receiving surface of the camera 78 as illustrated in FIG. 22. An apex pitch of the fluorescent light becomes 12 μm, which is the same as the pinhole pitch. The pixel size of the camera 78 is 4 μm. This is smaller than ½ of 12 μm that is an apex pitch of the fluorescent light (a pitch of the fluorescent light). Accordingly, the camera 78 has a sampling pitch that is sufficient for measuring the pitch of the fluorescent light.

Here, the pitch of the fluorescent light (0.12 μm) is smaller than 0.21 μm that is the Airy disk radius. This allows the microscope device 70 to observe with a higher resolution in the XY direction than that of the known microscope. Accordingly, the difference between the first image data and the second image data is obtained after imaging is performed in the second control. This consequently allows for acquisition of the confocal image with a higher resolution in the XY direction.

Figure 23:
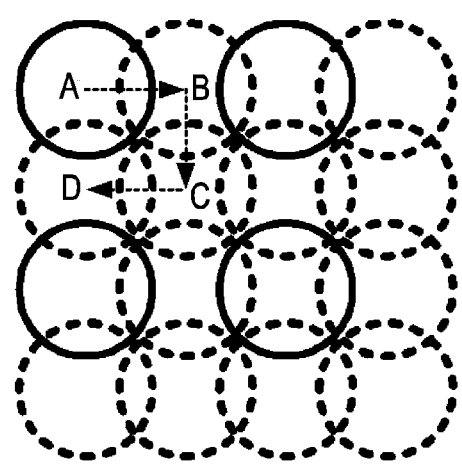
FIG. 23 is an explanatory diagram illustrating movement of the entire pinhole array.

As illustrated in FIG. 23, the whole pinhole array 75c may be moved on a planar surface perpendicular to the optical axis by ½ of the pitch of the pinhole. In this case, the pinhole moves to A, B, C, and D in this order as illustrated in FIG. 23. The four confocal images may be obtained in accordance with this movement. This allows for acquisition of information between the pitches, thus complementing the image data. This allows for acquisition of the image with a higher resolution.

The microscope device according to the present disclosure may be expressed as following first to tenth microscope devices. A first microscope device includes a light source, a detecting unit, phase distribution control means, a controller, and an image generating unit. The light source oscillates coherent illuminating light. A specimen is irradiated with the illuminating light. The detecting unit detects fluorescent light by the illuminating light applied on the specimen as feedback light. The phase distribution control means is disposed at least in an optical path of the illuminating light. The phase distribution control means controls phase distribution of the illuminating light. The controller controls the phase distribution control means to vary the phase distribution. The image generating unit operates a difference of the feedback light between before and after the phase distribution varies to generate an image of the specimen.

A second microscope device is configured as follows. In the first microscope device, the controller performs first control that controls the phase distribution control means such that all rays of illuminating light that are emitted from the light source have a uniform phase, and performs second control that controls the phase distribution control means such that the illuminating light has phase distribution where the rays of illuminating light that are emitted from the light source mutually interfere on the focal point. The image generating unit operates a difference between the feedback light when the first control is performed and the feedback light when the second control is performed to generate an image.

A third microscope device is configured as follows. In the second microscope device, the phase distribution control means is disposed in a pupil position or a position equivalent to a pupil of an objective lens that focuses the illuminating light on the specimen.

A fourth microscope device is configured as follows. In the third microscope device, the controller controls the phase distribution control means such that the rays of illuminating light mutually interfere so as to cancel one another on a focal point.

A fifth microscope device is configured as follows. In the third microscope device, the phase distribution control means provides a phase to correct spherical aberration. The spherical aberration is generated in the illuminating light by a refractive index difference between a refractive index of a medium of an optical path to the specimen and a refractive index of a medium of the specimen.

A sixth microscope device is configured as follows. In any of the first to fifth microscope devices, the focal point is scanned on a planar surface perpendicular to an optical axis so as to generate an image.

A seventh microscope device is configured as follows. In any of the first to fifth microscope devices, a large number of focal points are projected on a planar surface perpendicular to an optical axis so as to generate an image.

An eighth microscope device is configured as follows. In the seventh microscope device, coherent light passes through a pinhole array to generate a plurality of rays of diverging light. Additionally, the pinhole array is projected to project the large number of focal points on a planar surface perpendicular to an optical axis.

A ninth microscope device is configured as follows. In the eighth microscope device, each pinhole of the pinhole array is combined with an optical element with lens effect.

A tenth microscope device is configured as follows. In the ninth microscope device, phase shifting means is disposed in the pinhole array. The phase shifting means varies phases of light that passes through the adjacent pinhole in the pinhole array.

In the technique disclosed in JP-A-2010-197986, it is necessary to perform modulation with a specific frequency for each focal point by interference. In view of this, the illuminating light is necessary to stay on each focal point for a certain period of time. That is, this technique generates interference of rays of light that are modulated using mutually different frequencies, and the intensity modulation is performed only in an intersection region using a frequency that is a difference between frequencies of these rays of light. Thus, the light is necessary to stay for a certain period of time. This causes delay of image generation speed.

The spatial light phase modulator 21 may have a configuration that provides different phases in the laser light L and the feedback light R. The motor control unit 33 may control the motor 10. The motor control unit 33 controls the motor 10 to rotate. This applies rotation force to the motor 10.

The input unit 35 may input a light amount detected based on the feedback light R that is received by the camera 16 as the light amount data. The photo-receiving surface of the camera 16 may be scanned with the feedback light R. The input unit 35 may receive the light amount data of the received feedback light R, and may output the light amount data to the image generating unit 36. The image generating unit 36 may generate an image of a scanned area of the specimen S based on light amount data that is generated by scanning with the feedback light R. This may be used as image data.

The microscope device 1 illustrated in FIG. 1 may control such that all phases of the laser light L and the feedback light R are uniform (uniform phases) when the laser light L is oscillated at the first time. In other words, FIG. 4A illustrates a state where the spatial light phase modulator 21 controls the cross sections of the laser light L and the feedback light R in the optical path to have uniform phases. In the second control, as illustrated in FIG. 5A, the spatial light phase modulator 21 may control to provide a phase difference where a phase continuously varies from zero to $2\pi$ in the circumferential direction to the laser light L.

The laser light L operated upon by the spatial light phase modulator 21 may be focused on the focal point F in the predetermined depth of the specimen S by the objective lens 22. At this time, the laser light L operated upon by the spatial light phase modulator 21 is condensed by the objective lens 22. As a result, phases of components opposed to each other with respect to the optical axis are shifted by $\pi$ in the center of the optical axis of the focal surface FS. The rays of light interfere with and weaken each other. On the other hand, the rays of light that are interfered with strengthen each other in a position where the phase becomes zero or $2\pi$ from $\pi$ on the circumference separated from the center of the optical axis. Interference of the excitation light in accordance with these phase variations only occurs on the focal point.

The microscope device 1 illustrated in FIG. 1 has the intensity distribution of the laser light L on the focal point F of the specimen S as illustrated in FIG. 5b. Similarly, assuming that fluorescent light is evenly emitted near the focal point of the laser light of the specimen S as the feedback light R, this feedback light R is also operated upon by the spatial light phase modulator 21. In the feedback light R that is emitted in the center of the optical axis on the focal surface FS, phases of components opposed to each other with respect to the optical axis are shifted by $\pi$. Thus, the rays of feedback light R interfere with each other in the pinhole 8P, and weaken each other. On the other hand, the feedback light R from the circumference that is separated from the center of the optical axis at certain distance has a phase difference that varies from $\pi$ on the pinhole 8P. Thus, the rays of feedback light R from the position where the phase difference becomes zero or $2\pi$ strengthen each other. Accordingly, when fluorescent light is evenly emitted near the focal point as the feedback light R, the intensity distribution of the feedback light R that reaches the pinhole 8P similarly becomes as illustrated in FIG. 5b by influence of the interference. This interference of the fluorescent light significantly occurs only in the fluorescent light that is emitted from near the focal point and forms an image in the pinhole.

The controller 17 may be software that operates on a computer. The software, which operates on a computer, has functions of the respective units in FIG. 3. This consequently allows for observation of the deep portion of the specimen S without any special circuit such as a bandpass filter. The dichroic mirror 76 may be disposed ahead of the emitting direction of the laser light L of the pinhole array 75.

In other words, Modification 1 shows an exemplary phase that is provided by the spatial light phase modulator 21 to the laser light L and the feedback light R when the second image data is generated (that is, when the second control is performed). At this time, in the spatial light phase modulator 21, a region with a phase difference of zero and a region with a phase difference of $\pi$ are alternately arranged in the circumferential direction as illustrated in FIG. 8A When the spatial light phase modulator 21 illustrated in FIG. 10A is used, the component with the phase difference of zero and the component with the phase difference of $\pi$ interfere with each other in the center of the optical axis on the focal surface FS when rays of light are condensed by the objective lens 22. Thus, the rays of light weaken each other. On the other hand, intensity becomes higher in the separating direction from the center of the optical axis and the intensity becomes the highest in a portion where the phase difference becomes zero or $2\pi$ by interference.

In Modification 5, the respective areas are separated into small areas as illustrated in FIG. 18. Control to provide the laser light L with a phase difference from zero to $3/2\pi$ in the respective areas may be performed. Subsequently, the laser light L may be oscillated by the laser light source 72 at the second time.

In the microscope device 70 illustrated in FIG. 14, in a state where the whole pinhole array 75c moves on a planar surface perpendicular to the optical axis by ½ of the pitch of the pinhole as illustrated in FIG. 23, the four confocal images are obtained from A, B, C, and D in this order. This allows for acquisition of information between the pitches, thus complementing the image data. This additionally allows for acquisition of the image with a higher resolution.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A microscope device comprising:
    a light source configured to oscillate a coherent illuminating light, the illuminating light being applied on a specimen;
    a detecting unit configured to detect a fluorescent light from the specimen as a feedback light, the specimen being irradiated with the illuminating light;
    a phase distribution control unit disposed in an optical path of the illuminating light, the phase distribution control unit being configured to control a phase distribution of the illuminating light;
    a controller configured to control the phase distribution control unit to vary the phase distribution; and
    an image generating unit configured to operate a difference of the feedback light between before and after the phase distribution varies, to generate an image of the specimen.

2. The microscope device according to claim 1, wherein the controller is configured to:

perform a first control that controls the phase distribution control unit such that almost a whole illuminating light has a uniform phase; and perform a second control that controls the phase distribution control unit such that the illuminating light has a phase distribution where rays of the illuminating light mutually interfere on a focal point, and the image generating unit is configured to operate a difference between the feedback light in the first control and the feedback light in the second control, to generate an image of the specimen.

3. The microscope device according to claim 2, further comprising an objective lens configured to focus the illuminating light on the specimen, wherein the phase distribution control unit is disposed in a position equivalent to a pupil including a pupil position of the objective lens.

4. The microscope device according to claim 3, wherein the controller is configured to control the phase distribution control unit such that rays of the illuminating light mutually interfere so as to cancel one another on the focal point.

5. The microscope device according to claim 3, wherein the phase distribution control unit is configured to provide a phase to correct spherical aberration, the spherical aberration being generated in the illuminating light by a refractive index difference between a refractive index of a medium of an optical path to the specimen and a refractive index of a medium of the specimen.

6. The microscope device according to claim 1, wherein the illuminating light is configured to scan a planar surface approximately perpendicular to an optical axis of the specimen.

7. The microscope device according to claim 1, wherein plural focal points in the illuminating light are projected to a planar surface approximately perpendicular to the optical axis.

8. The microscope device according to claim 7, further comprising a pinhole array, wherein the illuminating light passes through the pinhole array so as to project the plural focal points on the planar surface approximately perpendicular to the optical axis.

9. The microscope device according to claim 8, wherein the pinhole array includes a pinhole where an optical element with a lens effect is disposed.

10. The microscope device according to claim 9, further comprising a phase shifting unit disposed in every two pinholes of the pinhole array, the phase shifting unit being configured to vary a phase of a light.

\* \* \* \* \*